US011960102B2

(12) United States Patent
Xu et al.

(10) Patent No.: US 11,960,102 B2
(45) Date of Patent: Apr. 16, 2024

(54) PINPOINTING SINGLE MOLECULE POSITIONS WITH IN SITU POINT SPREAD FUNCTION RETRIEVAL FOR THREE DIMENSIONAL NANOSCOPY OF WHOLE CELLS AND TISSUES

(71) Applicant: Purdue Research Foundation, West Lafayette, IN (US)

(72) Inventors: Fan Xu, West Lafayette, IN (US); Fang Huang, West Lafayette, IN (US); Donghan Ma, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 349 days.

(21) Appl. No.: 17/628,140

(22) PCT Filed: Aug. 6, 2020

(86) PCT No.: PCT/US2020/045253
§ 371 (c)(1),
(2) Date: Jan. 18, 2022

(87) PCT Pub. No.: WO2021/026381
PCT Pub. Date: Feb. 11, 2021

(65) Prior Publication Data
US 2022/0283443 A1  Sep. 8, 2022

Related U.S. Application Data

(60) Provisional application No. 62/883,495, filed on Aug. 6, 2019.

(51) Int. Cl.
*G06K 9/00* (2022.01)
*G01N 21/64* (2006.01)
(Continued)

(52) U.S. Cl.
CPC ......... *G02B 27/58* (2013.01); *G01N 21/6458* (2013.01); *G02B 21/367* (2013.01);
(Continued)

(58) Field of Classification Search
CPC ........... G01N 21/6458; G01N 21/6428; G01N 33/582; G01N 2021/6441;
(Continued)

(56) References Cited

U.S. PATENT DOCUMENTS 9,538,157 B2  1/2017  Peistun et al.
9,784,666 B2  10/2017  Mai et al.
(Continued)

FOREIGN PATENT DOCUMENTS

WO  2020081125  4/2020

OTHER PUBLICATIONS

Wang et al., Localization events-based sample drift correction for localization microscopy with redundant crosscorrelation algorithm. Opt. Express 22, 15982-15991 (2014).
(Continued)

*Primary Examiner* — Alex Kok S Liew
(74) *Attorney, Agent, or Firm* — Piroozi-IP, LLC

(57) ABSTRACT

A method of in situ point spread function (PSF) retrieval is disclosed which includes encoding 3D location of molecules into PSFs, receiving molecule-generated images containing PSFs, segmenting the images into sub-PSFs, initializing template PSFs from a pupil function, determining a maximum normalized cross correlation (NCC) coefficient (NCCmax) between the sub- and template PSFs, associating each of the sub-PSFs with a template PSF based on the NCCmax and storing the sub-PSFs in associated bins, aligning and averaging the binned sub-PSFs, applying a phase retrieval algorithm to the averaged sub-PSFs to update the pupil function, regenerating the template PSFs, repeating until a
(Continued)

difference between a new and a prior generation pupil function is below a predetermined threshold, generating in situ PSFs from the last pupil function, and applying a maximum likelihood estimation algorithm based on the in situ PSFs and the sub-PSFs to thereby generate lateral and axial locations of molecules.

20 Claims, 29 Drawing Sheets

(51) Int. Cl.
  *G02B 21/36* (2006.01)
  *G02B 26/08* (2006.01)
  *G02B 27/00* (2006.01)
  *G02B 27/58* (2006.01)
(52) U.S. Cl.
  CPC ..... *G02B 26/0825* (2013.01); *G02B 27/0068* (2013.01); *G06T 2207/10056* (2013.01)
(58) Field of Classification Search
  CPC .......... G01N 2021/6439; G01N 21/64; G01N 2015/0238; G01N 2015/1486; G01N 33/58; G01N 2021/6419; G01N 2021/6421; G01N 21/6408; G01N 21/6452; G01N 21/6456; G01N 33/5308; G01N 2021/6463; G06V 20/695; G06V 20/69; G06V 20/693; G06V 20/698; G06V 10/145; G06V 10/60; G06V 2201/04; G06V 2201/03
  See application file for complete search history.

(56) References Cited

U.S. PATENT DOCUMENTS

| | | | | |
|---|---|---|---|---|
| 2005/0204329 | A1* | 9/2005 | Pauca | G06T 5/73 716/55 |
| 2017/0160197 | A1* | 6/2017 | Ozcan | G06V 20/693 |
| 2017/0251191 | A1 | 8/2017 | Huang et al. | |
| 2019/0065818 | A1* | 2/2019 | Lee | G06T 7/174 |

OTHER PUBLICATIONS

Petrov et al., Measurement-based estimation of global pupil functions in 3D localization microscopy. Opt. Express 25, 7945-7959 (2017).
Azucena et al., Adaptive optics wide-field microscopy using direct wavefront sensing. Opt. Lett. 36, 825-827 (2011).
Cabriel et al., Aberration-accounting calibration for 3D single-molecule localization microscopy. Opt. Lett. 43, 174-177 (2018).
Burke et al., Adaptive optics correction of specimen-induced aberrations in single-molecule switching microscopy. Optica 2, 177-185 (2015).
Huang et al., Ultra-high resolution 3D imaging of whole cells. Cell 166, 1028-1040 (2016).
Aristov et al., ZOLA-3D allows flexible 3D localization microscopy over an adjustable axial range. Nat. Commun. 9, 2409 (2018).
Mlodzianoski et al., Active PSF shaping and adaptive optics enable volumetric localization microscopy through brain sections. Nat. Methods 15, 583-586 (2018).
Babcock et al., Analyzing single molecule localization microscopy data using cubic splines. Sci. Rep. 7, 552 (2017).
Liu et al., Enhanced 4Pi single-molecule localization microscopy with coherent pupil based localization. Communications Biology 3:220 (2020).
Betzig, E. et al. Imaging intracellular fluorescent proteins at nanometer resolution. Science 313, 1642-1645 (2006).
Huang et al., Three-dimensional super-resolution imaging by stochastic optical reconstruction microscopy. Science 319, 810-813 (2008).
Xu et al., Three dimensional nanoscopy of whole cells and tissues with in situ point spread function retrieval. Nature Methods, 17(5); 531-540 (Aug. 6, 2019).
Xu et al., Imaging objects through scattering layers and around corners by retrieval of the scattered point spread function. Optics Express, 25(26);32829-32840 (Dec. 18, 2017).
Liu et al., Enhanced 4Pi single-molecule localization microscopy with coherent pupil based localization and light sheet illumination. bioRxiv (2019).
Liu et al., Three dimensional single molecule localization using a phase retrieved pupil function. Opt. Express 21, 29462-29487 (2013).
ISR for PCT/US2020/45253.
Wyant et al., Basic wavefront aberration theory for optical metrology. Applied Optics and Optical Engineering (Academic, New York, 1992), vol. XI, 1-53 (1992).
Hess et al., Ultra-high resolution imaging by fluorescence photoactivation localization microscopy. Biophys. J. 91, 4258-4272 (2006).
Dempster et al., Maximum likelihood from incomplete data via the EM algorithm. J. R. Stat. Soc. Series B Methodol. 39, 1-38 (1977).
Hartigan et al., A k-means clustering algorithm. J. R. Stat. Soc. Series C Appl. Stat. 28, 100-108 (1979).
Hanser et al., Phase-retrieved pupil functions in wide-field fluorescence microscopy. J. Microscopy 216, 32-48 (2004).
Hell et al., Aberrations in confocal fluorescence microscopy induced by mismatches in refractive index. J. Microscopy 169, 391-405 (1993).
Wang et al., Direct wavefront sensing for high-resolution in vivo imaging in scattering tissue. Nat. Commun. 6, 7276 (2015).
Juette et al., Three-dimensional sub-100 nm resolution fluorescence microscopy of thick samples. Nat. Methods 5, 527-529 (2008).
Smith et al., Fast, single-molecule localization that achieves theoretically minimum uncertainty. Nat. Methods 7, 373-375 (2010).
Nieuwenhuizen et al., Measuring image resolution in optical nanoscopy. Nat. Methods 10, 557-562 (2013).
Li et al., Electron counting and beam-induced motion correction enable near-atomic-resolution singleparticle cryo-EM. Nat. Methods 10, 584-590 (2013).
Huang et al., Video-rate nanoscopy using sCMOS camera-specific single-molecule localization algorithms. Nat. Methods 10, 653-658 (2013).
Jungmann et al., Multiplexed 3D cellular super-resolution imaging with DNA-PAINT and Exchange-PAINT. Nat. Methods 11, 313-318 (2013).
Wang et al., Rapid adaptive optical recovery of optimal resolution over large volume. Nat. Methods 11, 625-628 (2014).
Laurence et al., Efficient maximum likelihood estimator fitting of histograms. Nat. Methods 7, 338-339 (2010).
Rust et al., Sub-diffraction-limit imaging by stochastic optical reconstruction microscopy (STORM). Nat. Methods 3, 793-796 (2006).
Tokunaga et al., Highly inclined thin illumination enables clear single-molecule imaging in cells. Nat. Methods 5, 159-161 (2008).
Azucena et al., Wavefront aberration measurements and corrections through thick tissue using fluorescent microsphere reference beacons. Opt. Express 18, 17521-17532 (2010).

\* cited by examiner

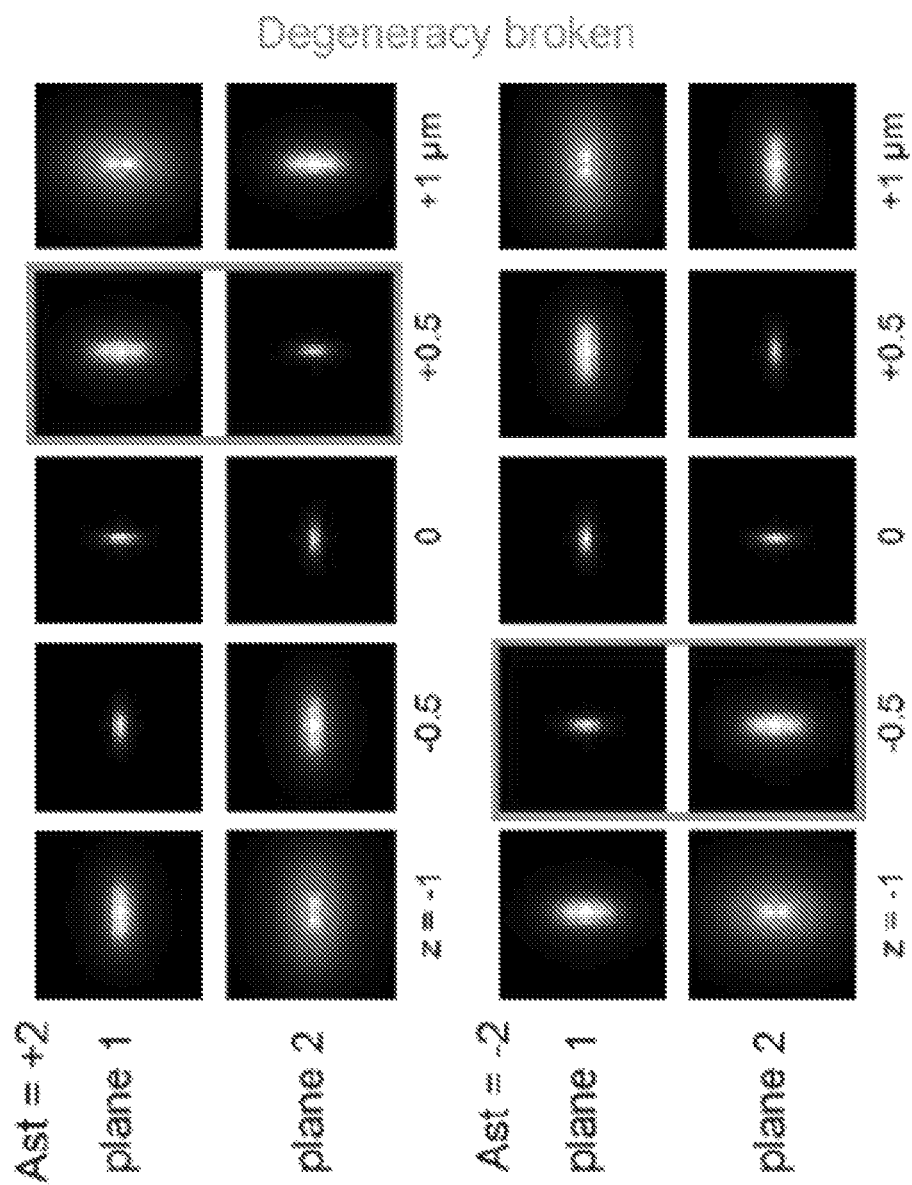
FIG. 1e1

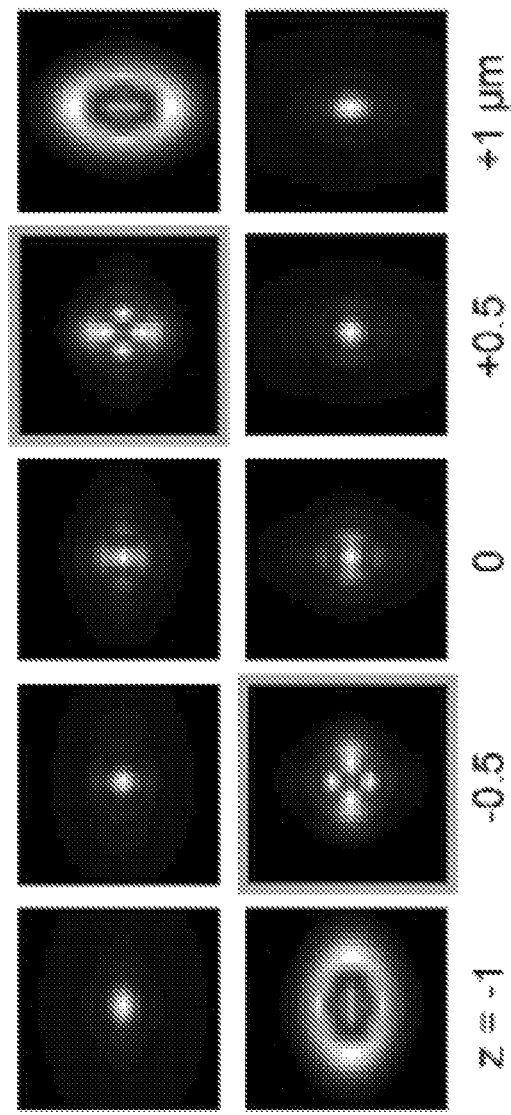
FIG. 1e2

PINPOINTING SINGLE MOLECULE POSITIONS WITH IN SITU POINT SPREAD FUNCTION RETRIEVAL FOR THREE DIMENSIONAL NANOSCOPY OF WHOLE CELLS AND TISSUES

CROSS-REFERENCE TO RELATED APPLICATIONS

The present patent application is a 35 U.S.C. § 371 Nationalization Application of and claims the priority benefit of the International Patent Application Serial No. PCT/US20/45253 filed Aug. 6, 2020, which is related to and claims the priority benefit of U.S. Provisional Patent Application Ser. No. 62/883,495 filed Aug. 6, 2019, the contents of each of which are hereby incorporated by reference in its entirety into the present disclosure.

STATEMENT REGARDING GOVERNMENT FUNDING

This invention was made with government support under GM119785 awarded by the National Institutes of Health and HR0011-62-3-6230 awarded by Department of Defense/Defense Advanced Research Projects Agency. The government has certain rights in the invention.

TECHNICAL FIELD

The present disclosure generally relates to nanoscopy systems and more specifically to methods and systems for obtaining 3D position of molecules within a specimen under nanoscopy investigation.

BACKGROUND

This section introduces aspects that may help facilitate a better understanding of the disclosure. Accordingly, these statements are to be read in this light and are not to be understood as admissions about what is or is not prior art.

Fluorescence microscopy is a powerful and versatile tool in visualizing organelle structures, interactions, and protein functions in biological contexts. However, the smallest resolvable feature (i.e. the resolution) is restricted by the wave nature of light, typically about 200 nm in the lateral plane and about 500 nm in the axial dimension. This century-old barrier has restricted our understanding of cellular functions, interactions, and dynamics, particularly at the sub-micron to nanometer scale. During the past decades, super-resolution fluorescence microscopy techniques, such as stimulated emission depletion (STED) microscopy, structured illumination microscopy (SIM), and single-molecule localization microscopy (SMLM) have overcome this fundamental limit offering up to 10-fold improvement in resolution and thus provided unprecedented opportunities to observe biological phenomena never before seen. Specifically, SMLM (also known as PALM/STORM), as well as its three-dimensional (3D) counterpart, utilizes photo-switchable/convertible dyes or proteins to isolate emission patterns of individual molecules in different camera frames. By analyzing these information-carrying patterns, the positions of individual molecules can be pinpointed with a precision as low as 5 nm in three dimensions.

The core of 3D single-molecule super-resolution imaging can be summarized as encoding and decoding the single molecule positions in the form of their emission patterns (i.e. point spread functions (PSFs)). A point spread function in imaging technology refers to response of the system to a point source. The encoding method, usually referred as PSF engineering, allows generating an emission pattern that changes, in an unambiguous and nondegenerate manner, with respect to the axial position (i.e., vertical position with respect to, e.g., a coverslip) of the single molecule. This encoding is needed since the molecules in, e.g., a biological specimen, may be positioned above or below a reference plane parallel to the coverslip. The decoding method infers the location of a single molecule inside the biological specimen from the emission pattern detected on the camera. This inference process utilizes a wide range of well-established mathematical tools such as feature-based mapping, regression, and deep learning to estimate the molecular position using a 3D PSF model, which describes the emission pattern of a single molecule with respect to its position within the specimen. It is, therefore, important to obtain an accurate model of the 3D PSF, which can reflect the complex biological and physical context constituting the path that the emitted photons travel through before being detected. Inaccurate models will give rise to imaging artifacts and significant deteriorations of the super-resolved 3D volume.

In generating the 3D positioning of molecules in a biological specimen, two issues need to be addressed: aberrations of the optical system; and aberration generated by the biological system, caused by the heterogeneous refractive indices of tissue constituents. To account for instrument imperfections, both analytical and numerical methods have been developed to provide an accurate model that matches recorded emission patterns from fiducial markers, in many cases using fluorescent beads on a coverslip surface. In addition, by retrieving the PSF model from beads embedded within a layer of gel or from fluorescent molecules coated on a latex microsphere, the effect of mismatched refractive indices between immersion oil and water-based imaging medium can be characterized. However, none of these approaches takes the biologically heterogeneous and optically complex cell or tissue specimen into account. Therefore, these inherent complexities of individual specimens render these in vitro calibrations inaccurate, especially when the intra- or extra-cellular targets are located away from the coverslip surface or inside thick tissues generating sample-induced aberrations. These sample-induced aberrations result in emission patterns that change depending on the local and highly complex biological environment and establish a major challenge for the practical application of single-molecule super-resolution imaging in whole-cell and tissue specimens.

Therefore, there is an unmet need for a novel approach to account for aberrations induced by both instrumentation imperfections and specimens in nanoscopy systems.

SUMMARY

A method of point spread function (PSF) retrieval for three-dimensional nanoscopy is disclosed. The method includes encoding 3D locations of molecules into a plurality of fluorescence emission patterns expressed as PSFs detected on a camera. The method also includes receiving one or more images containing a plurality of PSFs generated by molecules within a specimen. Additionally, the method includes segmenting the received one or more images into a plurality of sub-regions containing isolated PSFs (sub-PSFs) from point sources. The method also includes initializing a plurality of template PSFs, each of which is generated from an initial pupil function based on a corresponding axial distance between an image plane (where the point-source locates) and a focal plane of the objective. Furthermore, the method includes cross correlating each of the plurality of sub-PSFs with each of the plurality of template PSFs, thereby generating a corresponding plurality of normalized cross correlation coefficients. In addition, the method includes determining a maximum normalized cross correlation coefficient from the plurality of normalized cross correlation coefficients. Each of the plurality of sub-PSFs is associated with a corresponding template PSF of the plurality of template PSFs based on which template PSF produced the maximum normalized cross correlation coefficient and storing each of the plurality of sub-PSFs in an associated bin corresponding to each of the plurality of template PSFs. Each of the bin-associated sub-PSFs is aligned and the aligned sub-PSFs are averaged. The method also includes applying a phase retrieval algorithm to the averaged sub-PSFs to thereby update the pupil function. The plurality of template PSFs are regenerated from the updated pupil function. Above steps are repeated until a difference between a new and a prior generation pupil function is below a predetermined threshold. Thereafter, the method includes generating in situ PSFs from the last pupil function. The method also includes applying a maximum likelihood estimation algorithm based on the in situ PSFs and the plurality of sub-PSFs to thereby generate lateral and axial locations of molecules within the specimen.

According to one embodiment of the above method, the encoding is performed by applying a vertical astigmatism.

According to one embodiment of the above method, the vertical astigmatism is applied by a cylindrical lens.

According to one embodiment of the above method, the encoding is performed by applying a biplane detection, where two axially separated planes are detected, using one or more cameras.

According to one embodiment of the above method, the template PSFs and in situ PSFs are generated by calculating magnitude squared of a Fourier transform of the pupil function at different axial distances.

According to one embodiment of the above method, the phase retrieval algorithm includes inverse Fourier transform to the averaged aligned sub-PSFs.

According to one embodiment of the above method, the aligning is lateral.

According to one embodiment of the above method, the aligning is axial.

According to one embodiment of the above method, the aligning is lateral and axial.

According to one embodiment of the above method, the maximum likelihood estimation is based on maximizing probabilities of lateral and axial locations of molecules within the specimen based on the in situ PSFs and the plurality of sub-PSFs.

A system for point spread function (PSF) retrieval for three-dimensional nanoscopy, is also disclosed. The system includes a nanoscopy imaging device adapted to provide nanoscale images of objects. The system also includes a 3D encoder adapted to provide 3D location of molecules into a plurality of fluorescence emission patterns expressed as point spread functions (PSFs) detected on a camera. Additionally, the system includes a processing system, including memory and a processor. The processor is adapted to receive one or more images containing a plurality of PSFs generated by molecules within a specimen. Additionally, the processor is adapted to segment the received one or more images into a plurality of sub-regions containing isolated PSFs (sub-PSFs) from point sources. The processor is also adapted to initialize a plurality of template PSFs, each of which is generated from an initial pupil function based on a corresponding axial distance between an image plane (where the point-source locates) and a focal plane of the objective. Furthermore, the processor is adapted to cross correlate each of the plurality of sub-PSFs with each of the plurality of template PSFs, thereby generating a corresponding plurality of normalized cross correlation coefficients. In addition, the processor is adapted to determine a maximum normalized cross correlation coefficient from the plurality of normalized cross correlation coefficients. Each of the plurality of sub-PSFs is associated with a corresponding template PSF of the plurality of template PSFs based on which template PSF produced the maximum normalized cross correlation coefficient and store each of the plurality of sub-PSFs in an associated bin corresponding to each of the plurality of template PSFs. Each of the bin-associated sub-PSFs is aligned and the aligned sub-PSFs are averaged. The processor is further adapted to apply a phase retrieval algorithm to the averaged sub-PSFs to thereby update the pupil function. The plurality of template PSFs are regenerated from the updated pupil function. Above steps are repeated until a difference between a new and a prior generation pupil function is below a predetermined threshold. Thereafter, the processor is adapted to generate in situ PSFs from the last pupil function. The processor is also adapted to apply a maximum likelihood estimation algorithm based on the in situ PSFs and the plurality of sub-PSFs to thereby generate lateral and axial locations of molecules within the specimen.

According to one embodiment of the above system, the encoding is performed by applying a vertical astigmatism.

According to one embodiment of the above system, the vertical astigmatism is applied by a cylindrical lens.

According to one embodiment of the above system, the encoding is performed by applying a biplane detection, where two axially separated planes are detected, using one or more cameras.

According to one embodiment of the above system, the template PSFs and in situ PSFs are generated by calculating magnitude squared of a Fourier transform of the pupil function at different axial distances.

According to one embodiment of the above system, the phase retrieval algorithm includes inverse Fourier transform to the averaged aligned sub-PSFs.

According to one embodiment of the above system, the aligning is lateral.

According to one embodiment of the above system, the aligning is axial.

According to one embodiment of the above system, the aligning is lateral and axial.

According to one embodiment of the above system, the maximum likelihood estimation is based on maximizing probabilities of lateral and axial locations of molecules within the specimen based on the in situ PSFs and the plurality of sub-PSFs.

BRIEF DESCRIPTION OF DRAWINGS

FIG. 1e1 is a series of sub-PSFs shown in FIG. 1d using the biplane encoding.

FIG. 1e2 is a series of sub-PSFs using the astigmatism-based encoding.

FIG. 3l provides additional enlarged y'-z views of the outer membrane structures as indicated by the numbered white-boxed regions in 3a.

FIG. 3m is a distribution of $\sigma_z$ obtained from the intensity profiles of 25 typical outer membranes in FIG. 3a.

DETAILED DESCRIPTION

Figure 1A:
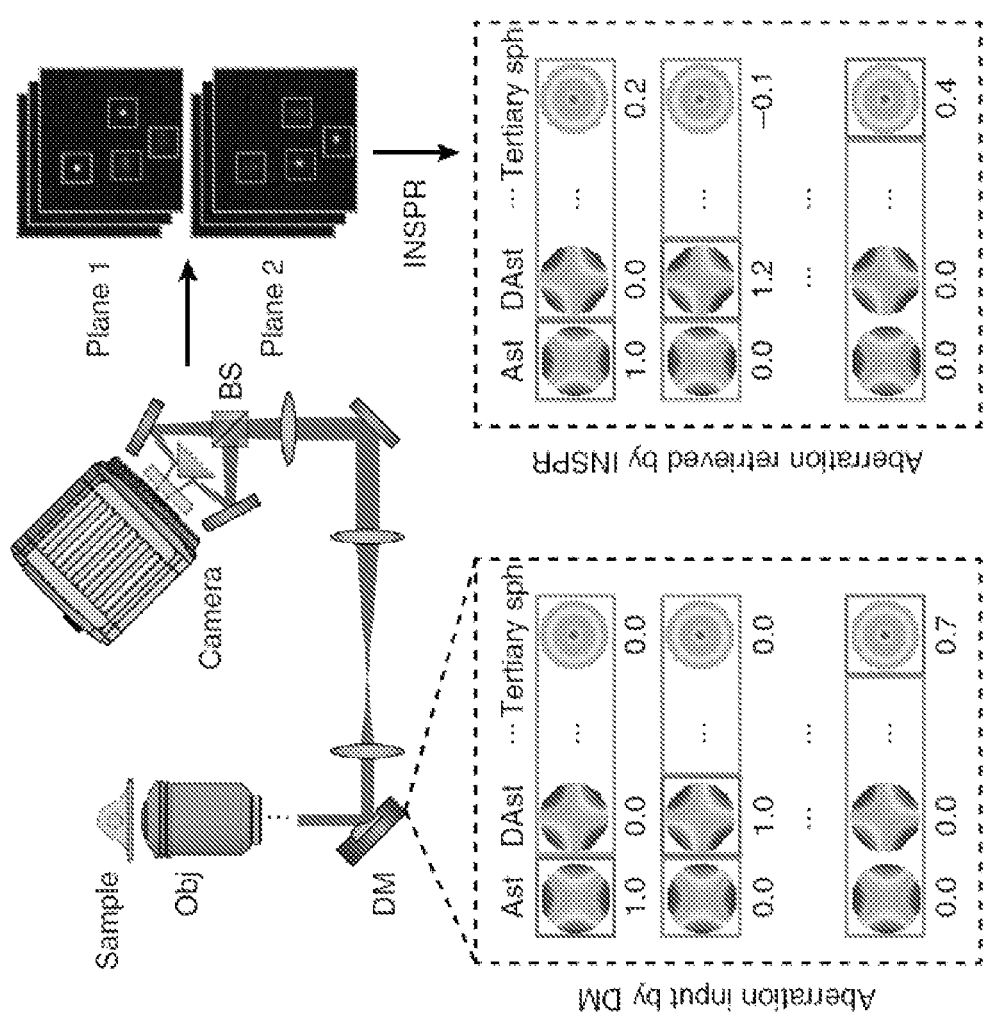
FIG. 1a is a schematic for a test setup used to demonstrate the in situ point spread function (PSF) retrieval algorithm, according to the present disclosure.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In the present disclosure, the term "about" can allow for a degree of variability in a value or range, for example, within 10%, within 5%, or within 1% of a stated value or of a stated limit of a range.

In the present disclosure, the term "substantially" can allow for a degree of variability in a value or range, for example, within 90%, within 95%, or within 99% of a stated value or of a stated limit of a range.

A novel approach to account for aberrations induced by both instrumentation imperfections and specimens in nanoscopy systems is provided in the present disclosure. Towards this end, a novel method is disclosed to enable the construction of an in situ PSF response directly from the obtained single molecule dataset. The disclosed method eliminates the PSF mismatch present due to these aberrations and its resulting imprecision in localization induced by both instrument imperfections and the local biological context. The ability of retrieving accurate 3D PSF models in situ allows pin-pointing the positions of single molecules with uncompromised accuracy and precision, therefore, resolving intra- or extra-cellular structures within whole-cell and tissue specimens with high resolution and fidelity. Applications of this novel method reach, but not limited to, across a range of cellular and tissue architectures from the nanoscale structures of mitochondrial networks, microtubules, and nuclear pore complexes throughout whole cells in 2D and 3D cultures, to amyloid β plaques in mouse brains and developing cartilage in embryonic mouse forelimbs.

To develop the model, a single molecule blinking dataset is used which is routinely obtained in 3D SMLM experiments. In this dataset, each frame contains multiple isolated emission patterns originated from single molecules located in the cellular volume. Collectively, these single molecule patterns can be regarded as random observations of emission patterns at various axial positions from the 3D PSF that are to be retrieve. Thousands to millions of such emission patterns are detected in each single molecule dataset. If correctly combined, these single molecule detections will provide an adequate reconstruction of their underlying 3D response function (i.e. a 3D PSF). The key that links these acquired single molecule patterns to the desired 3D response is the positions of the single emitters, in particular, their axial positions (again, the axial position refers to vertical position of molecules with respect to a reference plane parallel to the coverslip). However, this information is missing.

The method of the present disclosure is hereinafter referred to INSPR abbreviated for in situ PSF retrieval algorithm. Referring to FIG. 1a, a schematic for a test setup used to demonstrate the in situ PSF retrieval algorithm is provided. The test setup includes an objective and a sample positioned on a coverslip with a deformable mirror (DM) disposed along the optical path in the pupil plane. Various lenses are provided for encoding, as described further below. The performance of INSPR in a cellular dataset of immuno-labeled TOM20, a mitochondria marker, using DNA-PAINT, where the DM is inserted in the pupil plane of the microscope to introduce controllable wavefront distortions. Single molecule emission patterns distorted by the input Zernike-based aberrations are acquired, and then fed into INSPR to retrieve the in situ pupil and its corresponding aberrations. The inset connected to the DM shows the aberrations input by the DM. The PSFs obtained once passed through the method of the present disclosure generate the aberrations shown as those retrieved by INSPR.

The INSPR algorithm of the present disclosure in short iteratively uses two separate steps, namely assignment and update, to build an in situ PSF model from a collection of single molecule patterns. Pupil function, representing the wave field at the pupil plane of the microscope, is used to succinctly describe the 3D PSF response at arbitrary axial positions. As a quick overview, the INSPR algorithm starts with an ideal PSF (i.e. with a constant pupil) and then assigns each detected single molecule pattern to a temporary axial position through cross correlation with this ideal template. These axially assigned single molecule patterns are subsequently grouped, aligned, and averaged to form a 3D PSF stack, which provides a new pupil estimation (an 'update' to the previous pupil) through phase retrieval. This new pupil is then used in the next assignment step to generate an updated template. This process iterates until good agreement between the detected PSFs and the retrieved model is reached. The algorithm typically converges relatively quickly within 6-10 iterations (convergence criteria: the phase difference (measured by RMSE) between two adjacent iterations is smaller than $0.02\lambda$).

Figures 1B, 1C:
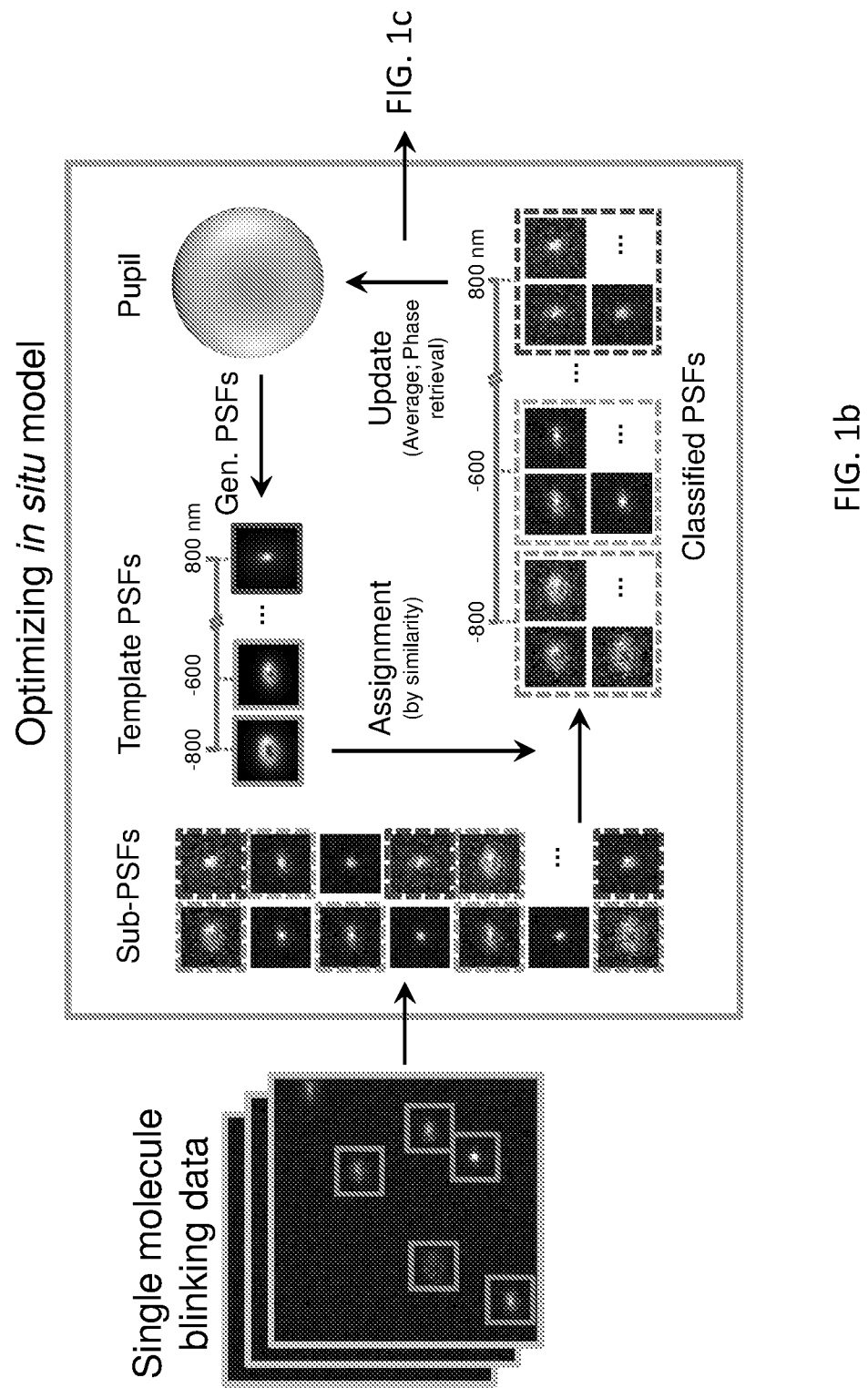
FIG. 1b is a diagram showing steps involved in the steps of the main algorithm, as provided by the present disclosure.
FIG. 1c provides examples of in situ PSFs, according to the present disclosure.
Figure 1C:
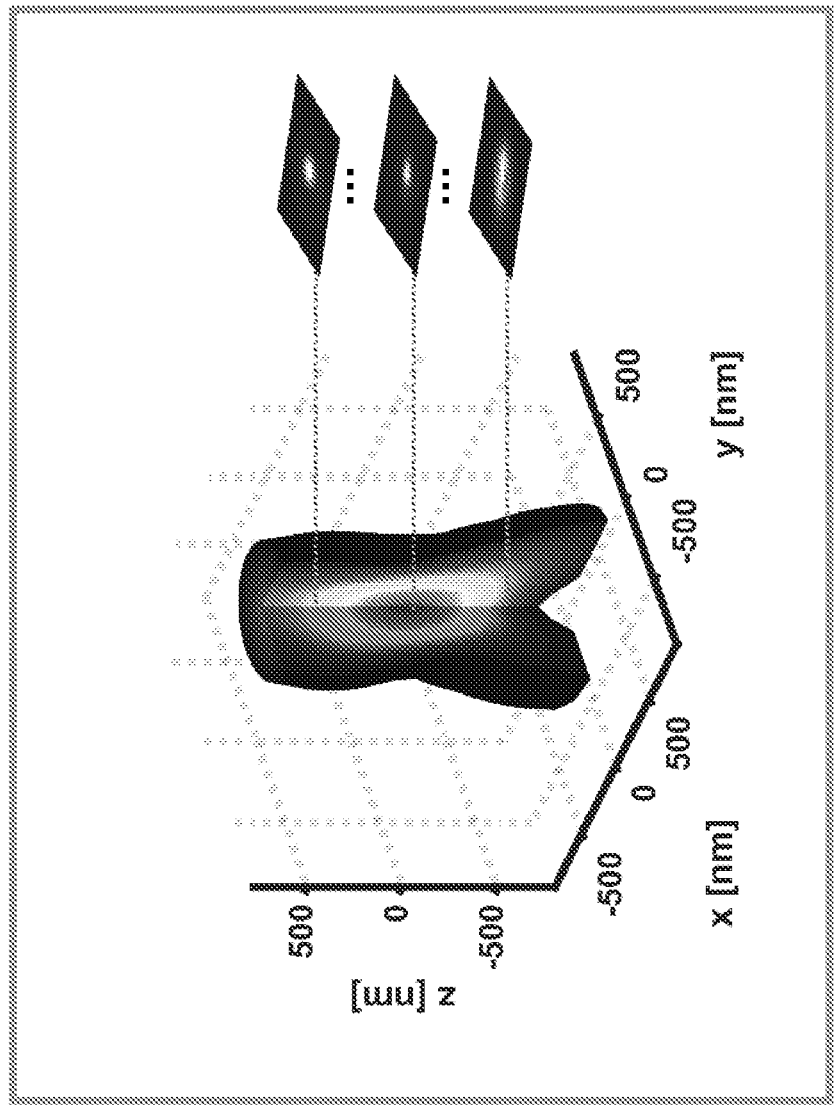
Figure 1D:
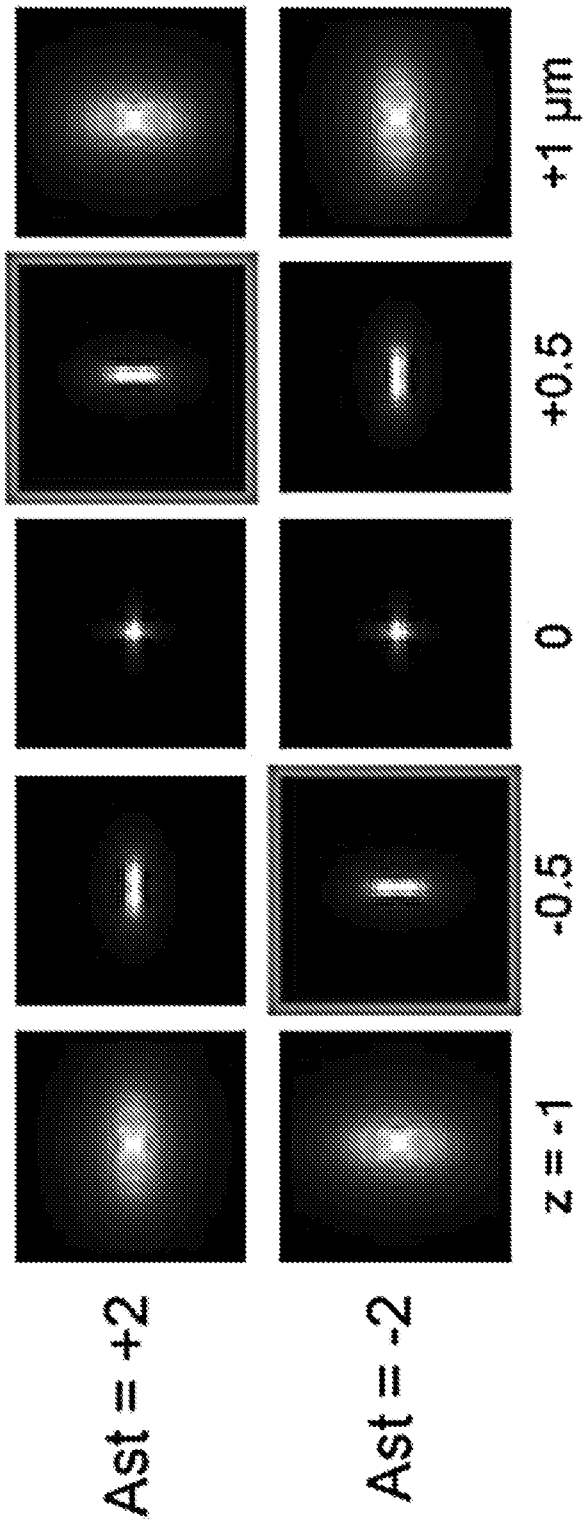
FIG. 1d is a series of sub-PSFs (i.e., segmented PSFs) showing degeneracy exists in a single plane configuration.

Referring to FIG. 1b, the resulting steps of the algorithm governing the method of the present disclosure are provided. Thousands to millions of single molecule emission patterns that have been encoded by various encoding schemes (e.g., inserting a cylindrical lens before the camera, detecting signals from two planes, etc.) are provided as single molecule blinking data. These images are initially segmented into a plurality of sub-regions containing isolated PSFs (sub-PSFs) each representing a point source. Thereafter, the method initializes a plurality of template PSFs from a predetermined library. Each template PSF of the plurality is from an initial pupil function, where each template PSF is established based on a corresponding axial distance between an object plane and an image plane. In other words, the template PSF is the magnitude squared of the Fourier transform of the pupil function at different axial distances.

Next the method cross correlates each of the plurality of sub-PSFs with each of the plurality of template PSFs, to thereby generate a corresponding plurality of cross correlation coefficients. The method then determines the maximum cross correlation coefficient from the plurality of cross correlation coefficients. Thereafter, the method associates each of the plurality of sub-PSFs with a corresponding template PSF and stores each of the plurality of sub-PSFs in an associated bin corresponding to each of the plurality of template PSFs. If the cross correlation coefficient is below a predetermined threshold, that sub-PSF is thrown away, and the method moves to the next sub-PSF. Once all the sub-PSFs that meet the cross correlation coefficient threshold requirement have been placed in the associated bins, the method laterally aligns each of the sub-PSFs that have been placed in the bins, as described below. Next the method averages the aligned sub-PSFs in each bin to generate averaged sub-PSFs. Next the method applies a phase retrieval algorithm to the averaged sub-PSFs to thereby update the pupil function. This is in essence an inverse Fourier transform applied to the averaged sub-PSFs. The output of the inverse Fourier transform updates the pupil function. Next the method regenerates the plurality of template PSFs from the updated pupil function. These steps are repeated until the difference between a new and a prior generation pupil function is below a predetermined threshold (e.g., convergence criteria: the phase difference (measured by RMSE) between two adjacent iterations is smaller than a range extending between about $0.01\lambda$ to about $0.2\lambda$, wherein $\lambda$ is the wavelength of the detected photons). This process iterates until the retrieved model no longer changes, which usually converges in 6-10 iterations. Once this threshold is achieved, the method generates in situ PSFs from the last pupil function (again by obtaining the magnitude squared of the Fourier transform of that last pupil function). Examples of the final in situ PSFs are shown in FIG. 1c. The method then applies a maximum likelihood estimation algorithm based on the in situ PSFs and the plurality of sub-PSFs to thereby generate lateral and axial locations of molecules within the specimen.

To build a unique in situ PSF model, the 3D single-molecule imaging modality must avoid degeneracies. Degeneracy appears when more than one state, a set of variables being estimated, lead to the same observation. One such state of INSPR is the wavefront shape, which describes the aberration introduced by the imaging system and specimen and can be decomposed by a series of Zernike polynomials, known to a person having ordinary skill in the art. Degeneracy arises when two different wavefront shapes (i.e. two different states) generate the same single molecule emission pattern (i.e. the observation). For example, positive and negative vertical astigmatism aberrations will generate identical PSF patterns at opposite axial positions, as provided in FIG. 1d which is a series of sub-PSFs showing degeneracy exists in the single plane configuration, where positive (associated with Ast=+2 (unit: $\lambda/2\pi$) and negative (associated with Ast=−2 (unit: $\lambda/2\pi$)) vertical astigmatism aberrations generate identical PSFs at opposite axial positions (as highlighted by the boxed regions), thus making them impossible to be classified in the bin assignment step. These degeneracies are broken up as shown in FIG. 1e1 which is the series of the sub-PSFs shown in FIG. 1d by using a biplane configuration, where a pair of emission patterns from the same single molecule is detected at two axially separated planes. By registering this pair of sub-PSFs in the bin assignment step, the in situ 3D PSF can be retrieved without ambiguity. Besides, this approach can also be used in an astigmatism-based SMLM setup by providing prior knowledge of the astigmatism orientation (as shown in FIG. 1e2 a series of the sub-PSFs using the astigmatism-based SMLM setup).

Figure 1F:
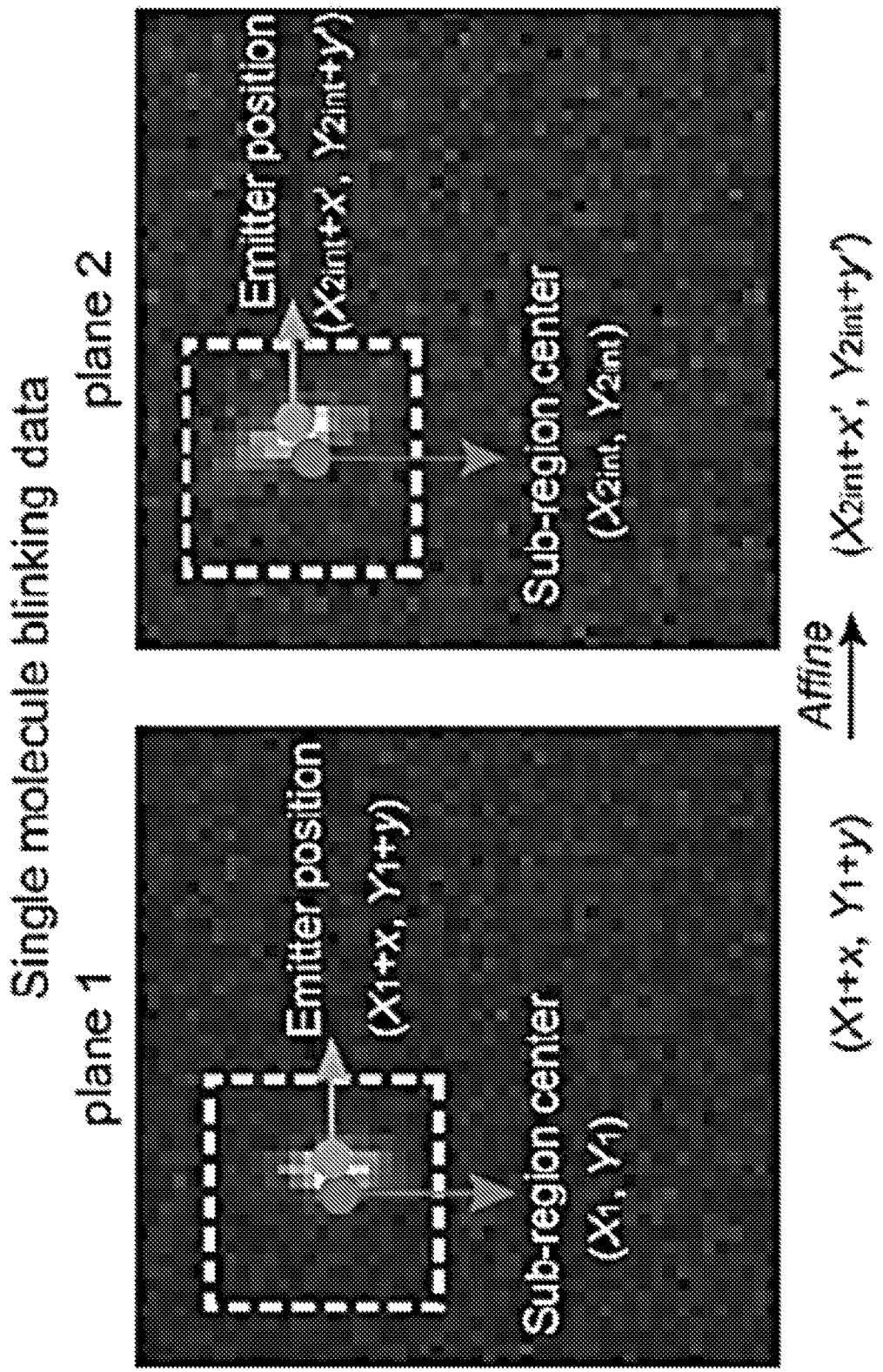
FIGS. 1f and 1g provide channel-specific in situ PSF for each detection plane separately where, for channel-specific localization, instead of transforming data directly from plane 2 to plane 1, the identified sub-region center from plane 1 ($X_1$, $Y_1$) is transformed to plane 2 ($X_{2int}$, $Y_{2int}$); thereafter two subregions are cropped from both planes.
Figure 1G:
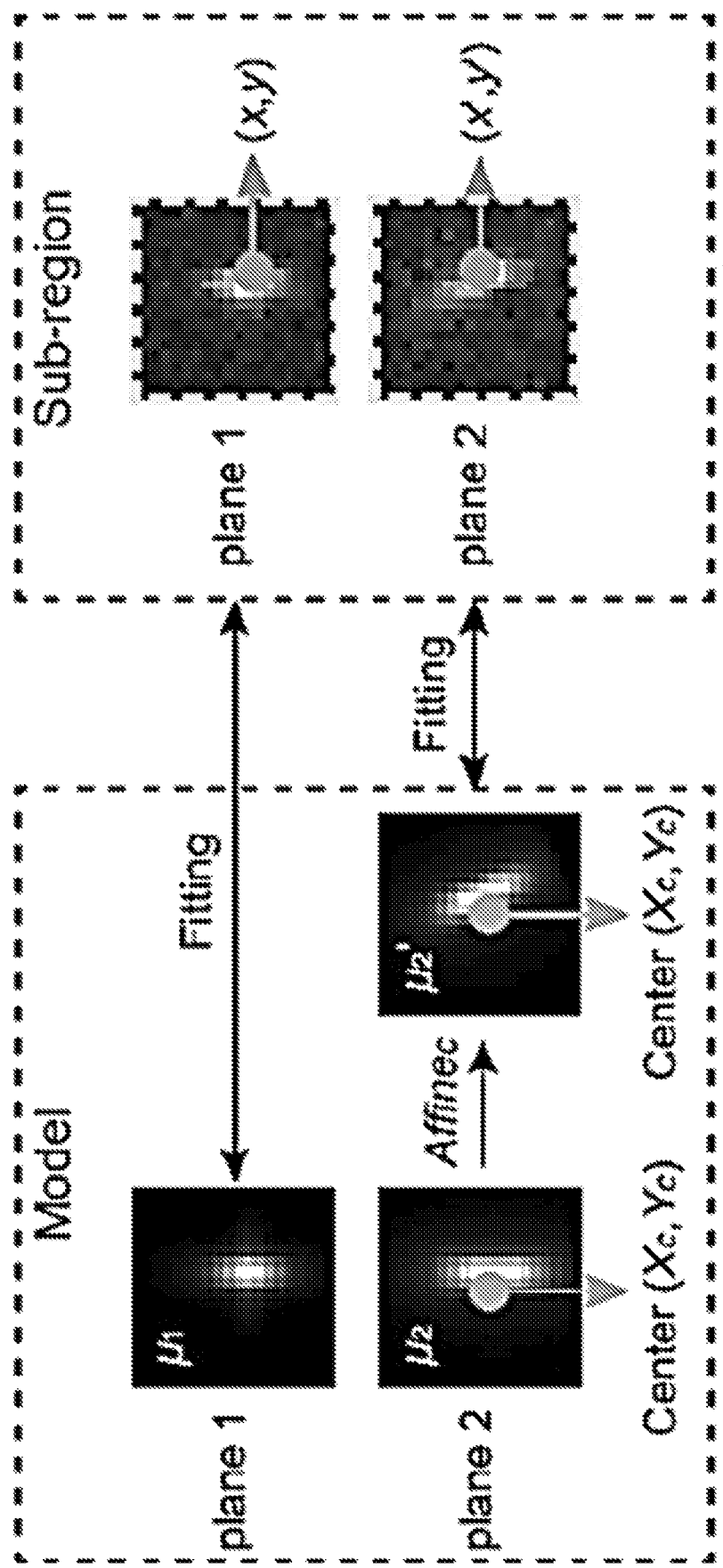
Figure 1H:
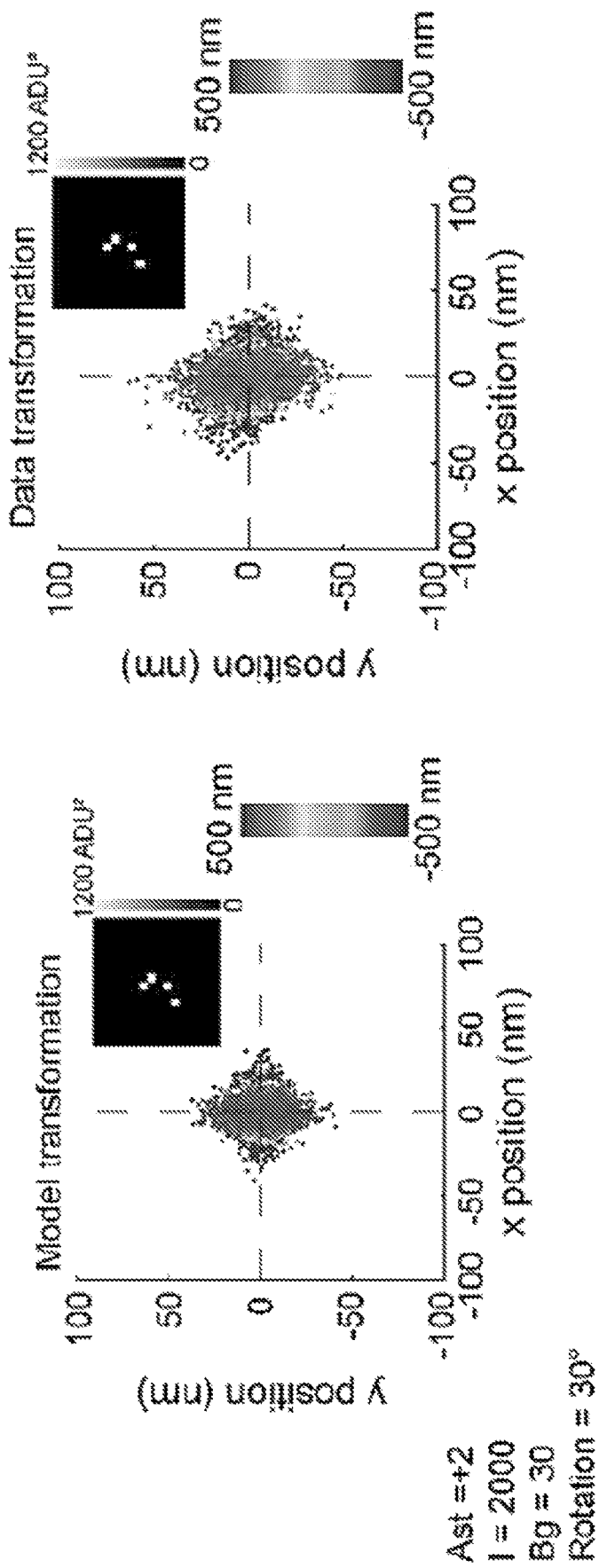
FIG. 1h provides scatter plots of lateral localizations using model transformation and data transformation for PSFs with vertical astigmatism.
Figure 1I:
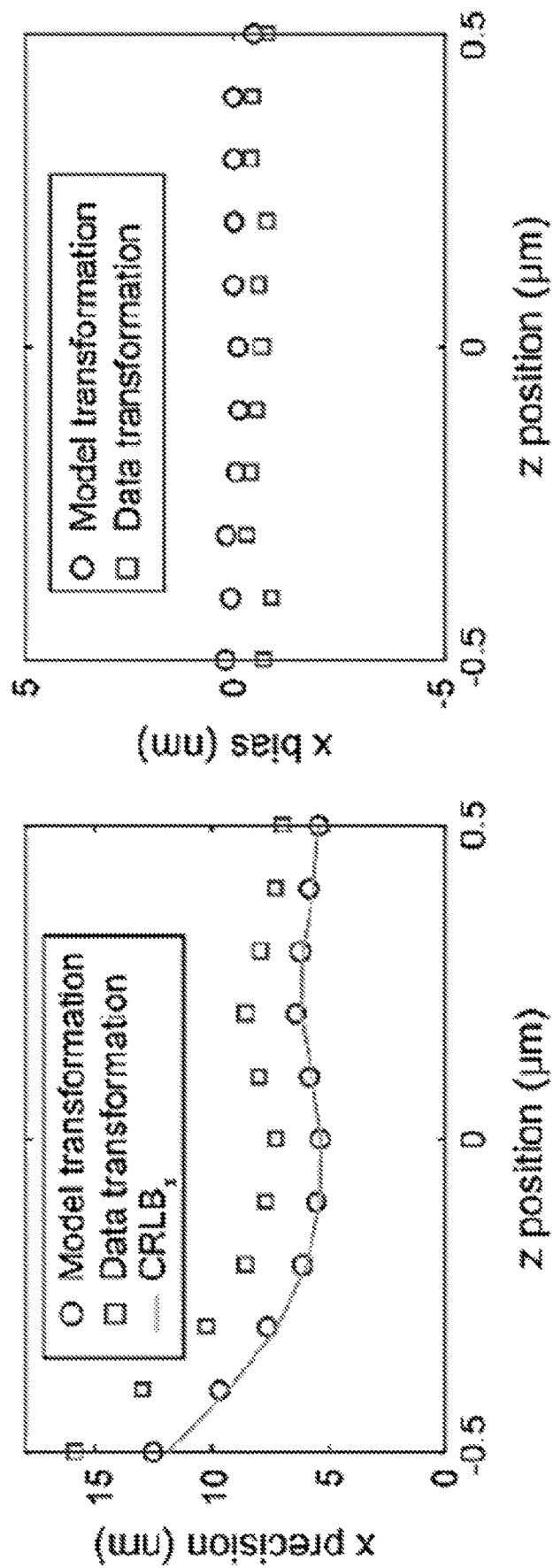
FIGS. 1i, 1j, and 1k show localization precisions and biases in the x, y, and z dimensions for datasets in FIG. 1h.
Figure 1J:
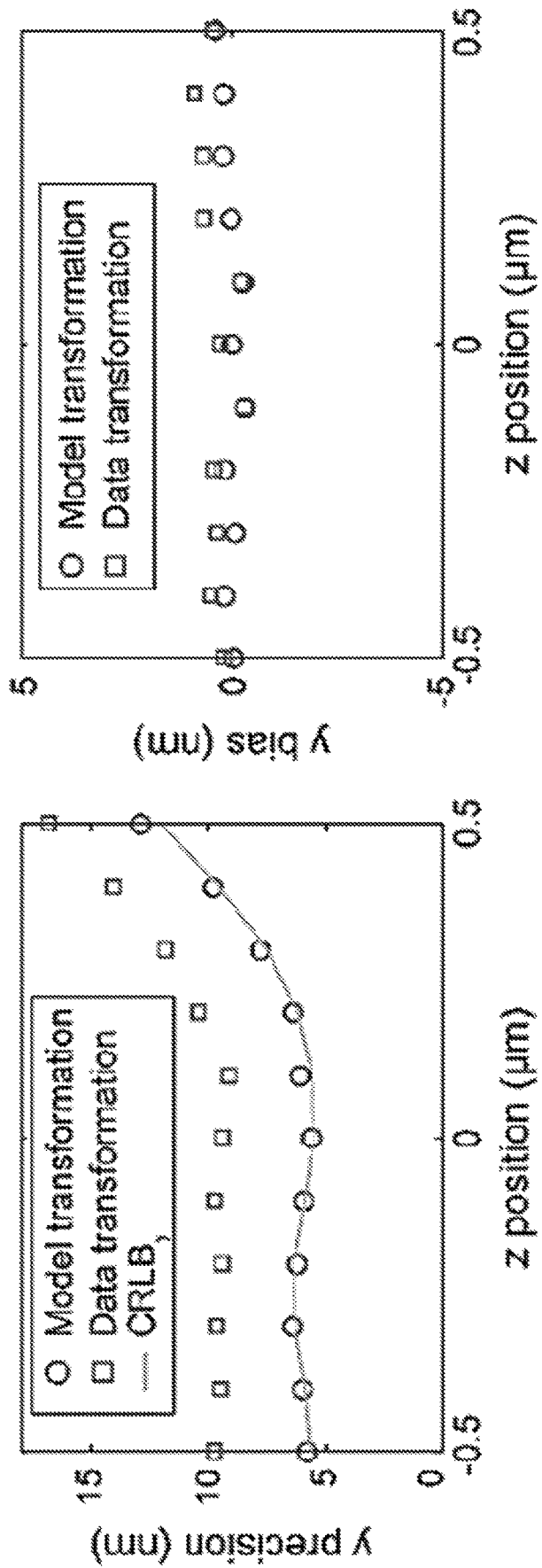
Figure 1K:
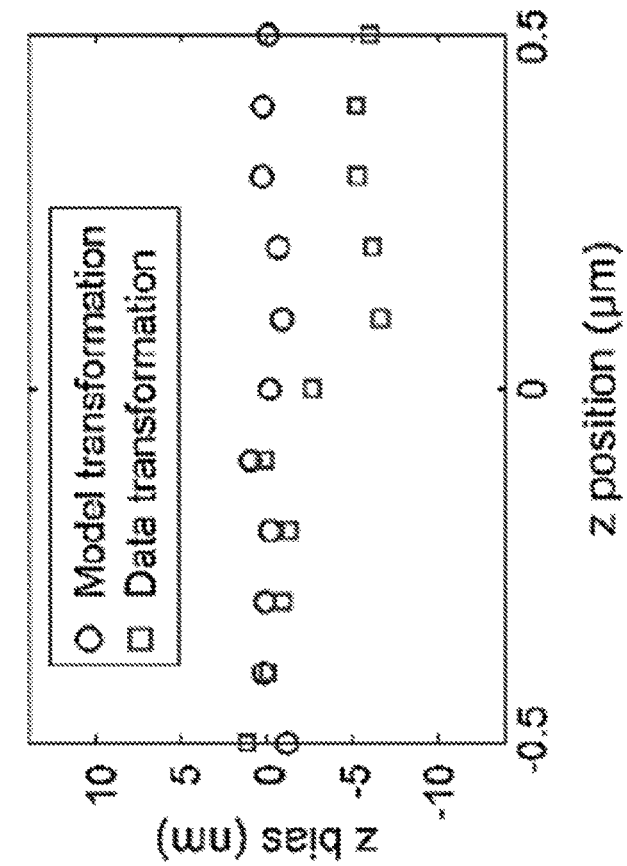
Figure 1K:
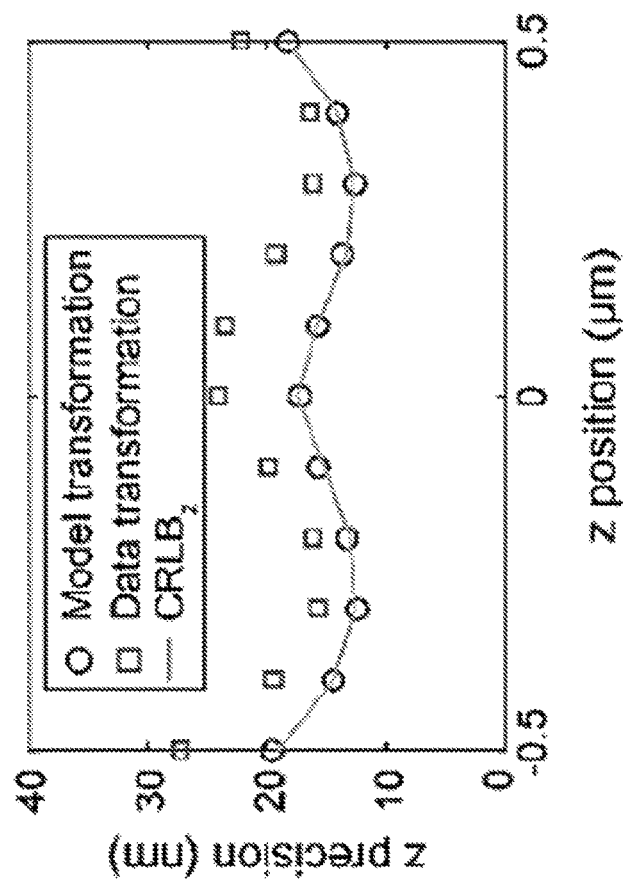

To pin-point single molecule positions with high precision and minimum bias, the INSPR method is further combined with a maximum likelihood estimator (MLE) method that incorporates sCMOS (scientific complementary metal-oxide-semiconductor) camera-specific pixel-dependent noise model to allow applications that rely on fast acquisition speed (e.g. in live-cell imaging) and large field of view (e.g. in high-throughput studies) offered by the CMOS sensor. To enable unaltered statistical properties of isolated single molecule emission patterns and their associated photon-counting and pixel-dependent noise, INSPR generates a channel-specific in situ PSF for each detection plane separately as shown in FIGS. 1f and 1g. Here, for channel-specific localization, instead of transforming data directly from plane 2 to plane 1, the identified sub-region center from plane 1 ($X_1$, $Y_1$) is transformed to plane 2 ($X_{2int}$, $Y_{2int}$); thereafter two subregions are cropped from both planes. A fitting model $\mu_1$ for plane 1 is first generated, and then a channel-specific model $\mu_2'$ for plane 2 is generated which shares the same shape information with the cropped sub-region in plane 2. After that, this pair of channel-specific models is used for single molecule localization. This approach avoids transforming and interpolating the single molecule dataset and, therefore, allows reducing imaging artifacts and localization imprecision when using multiple detection planes, as the statistical properties of the raw detected camera counts will be lost during transformation as shown in FIG. 1h (which shows scatter plots of lateral localizations using model transformation and data transformation for PSFs with vertical astigmatism. This method using model transformation provides localization precision achieving the Cramer-Rao lower bound (CRLB) and smaller bias. For each PSF, the total photon counts I was set to 2000, and the background bg was set to 30. Plane 1 and plane 2 are related with an affine transformation including a rotation of 30 degrees. Both Poisson noise and the pixel-dependent sCMOS readout noise (the variance distribution are shown in the insets) were considered in simulated datasets), and FIGS. 1i, 1j, and 1k (which show localization precisions and biases in the x, y, and z dimensions for datasets in FIG. 1h. The precisions of model transformation are close to CRLB in all three dimensions, and its biases are smaller than those of data transformation).

Figure 2A:
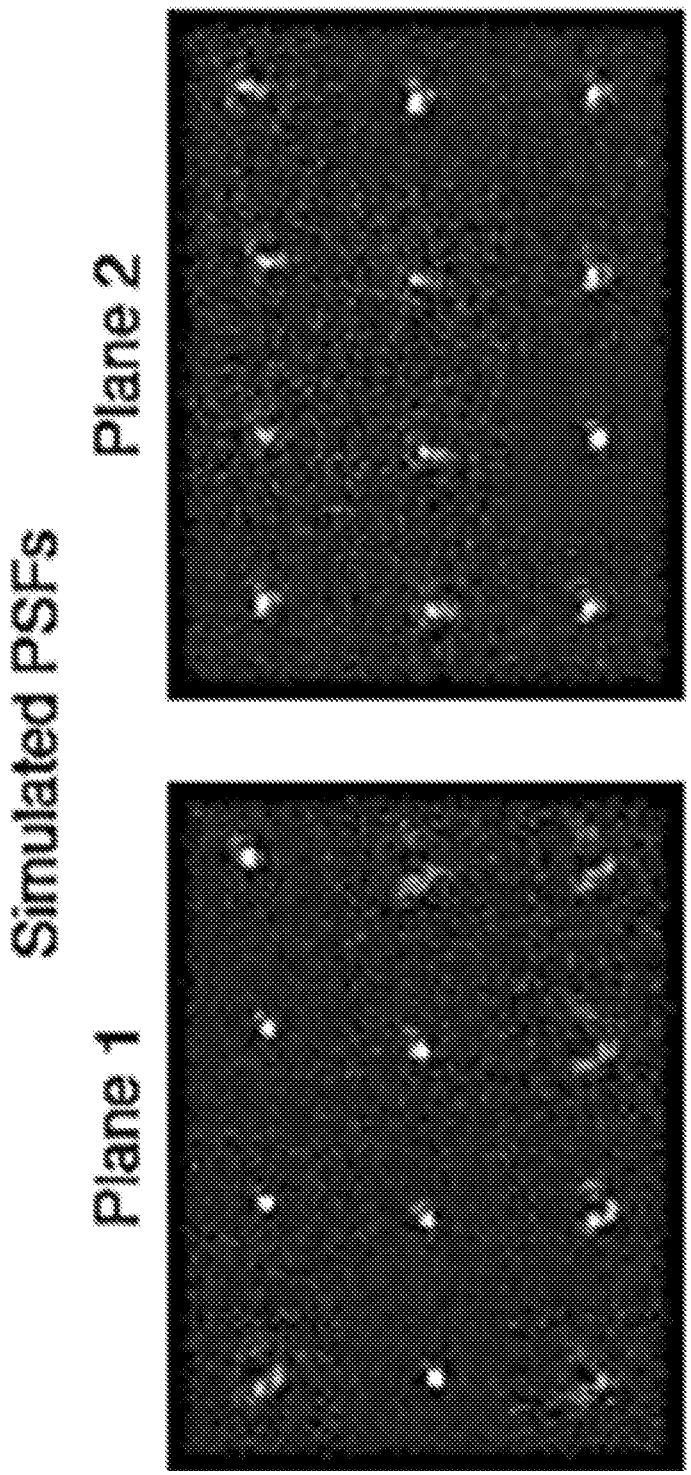
FIG. 2a shows a simulated biplane single molecule emission patterns located randomly over an axial range from −800 to +800 nm with a known wavefront distortion.
Figure 2B:
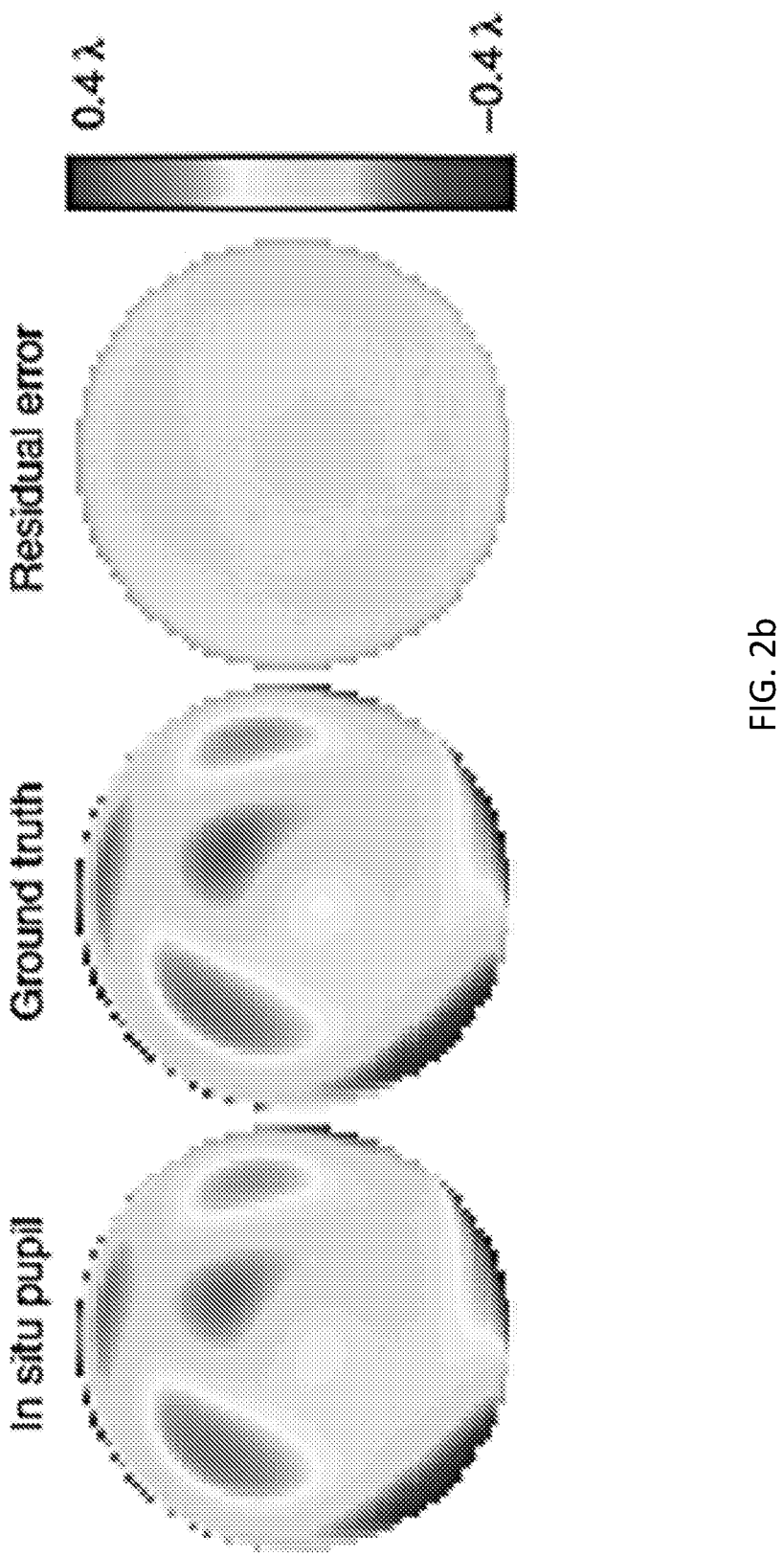
FIG. 2b provides phase of the in situ pupil retrieved by algorithm of the present disclosure (INSPR) which is identified as "in situ pupil".
Figure 2C:
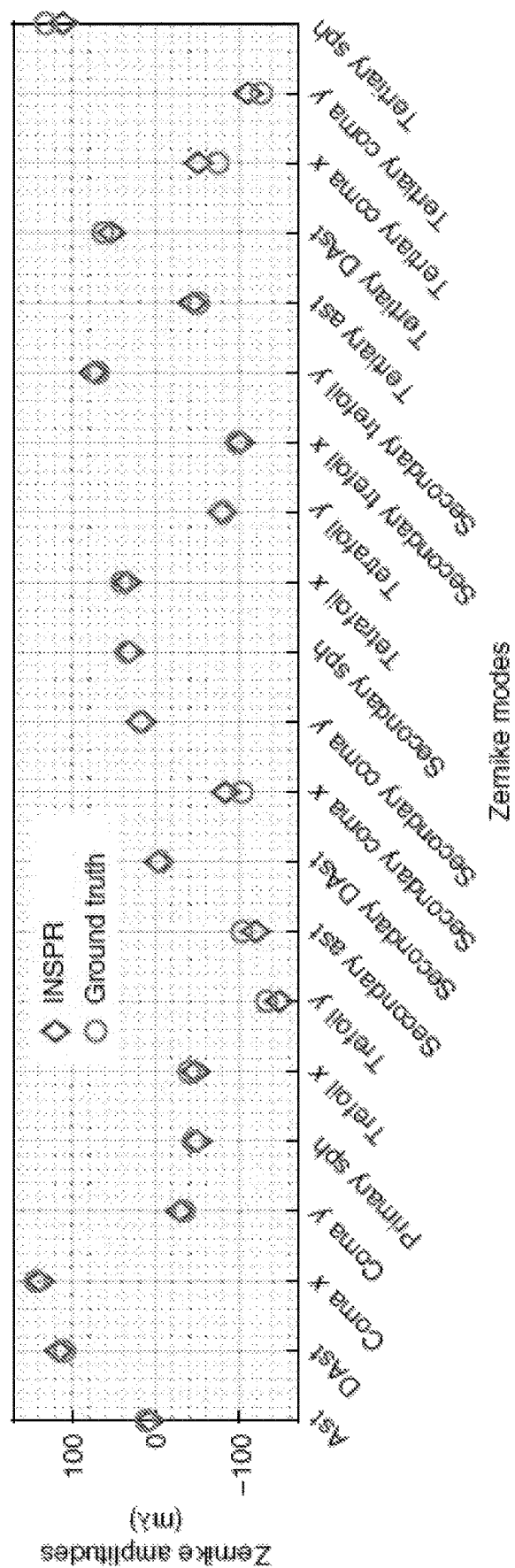
FIG. 2c provides amplitudes of 21 Zernike modes (Wyant order, from vertical astigmatism to tertiary spherical aberration) decomposed from the in situ pupil retrieved by INSPR (shown as diamonds), with an root-mean-square error (RMSE) of 11.1 mλ for the total 21 modes compared with ground truth (shown as circles).
Figure 2D:
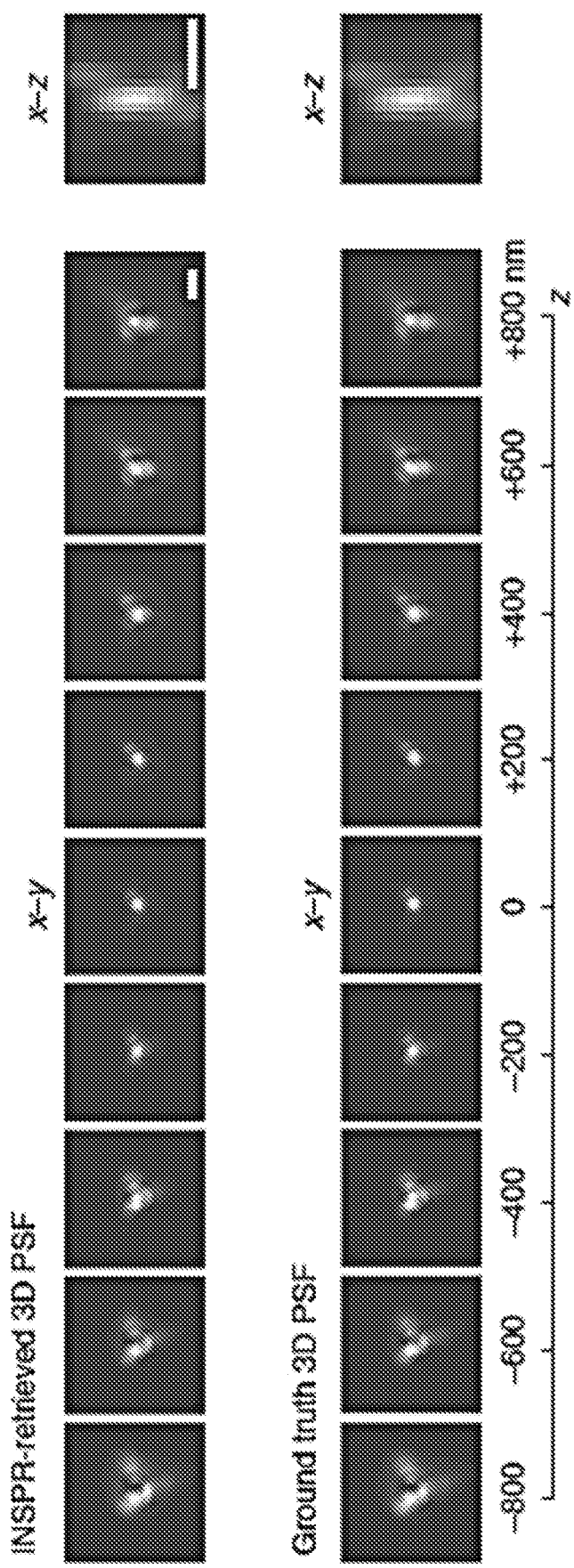
FIG. 2d provides x-y and x-z views of the INSPR retrieved PSFs, showing high degree of similarity with those generated by the known pupil function (i.e., ground truth).
Figure 2E:
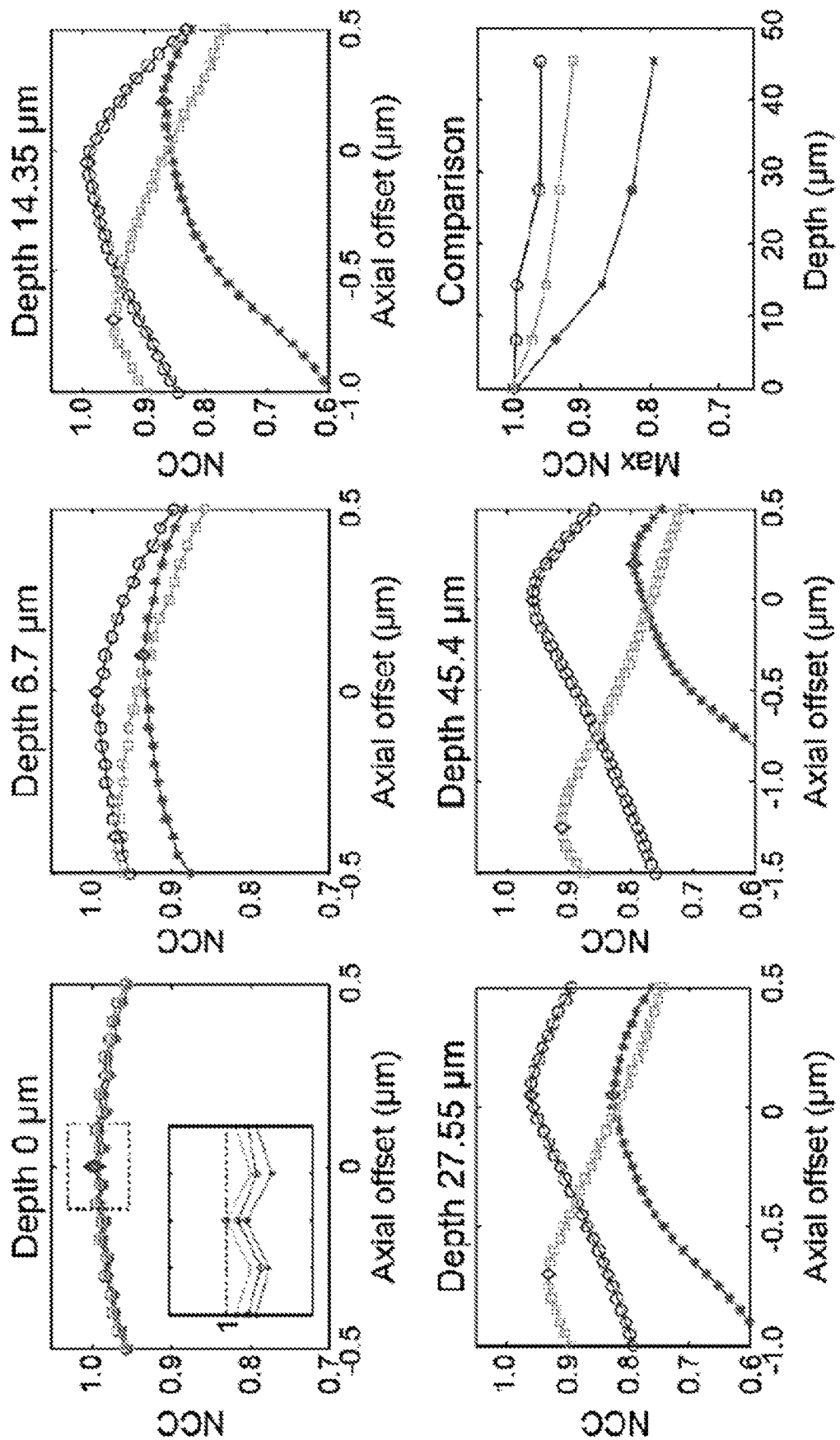
FIG. 2e provides similarity of the 3D PSFs at different imaging depths when using INSPR (circles), Gaussian model (stars), and theoretical index mismatch model (IMM, squares).
Figure 2F:
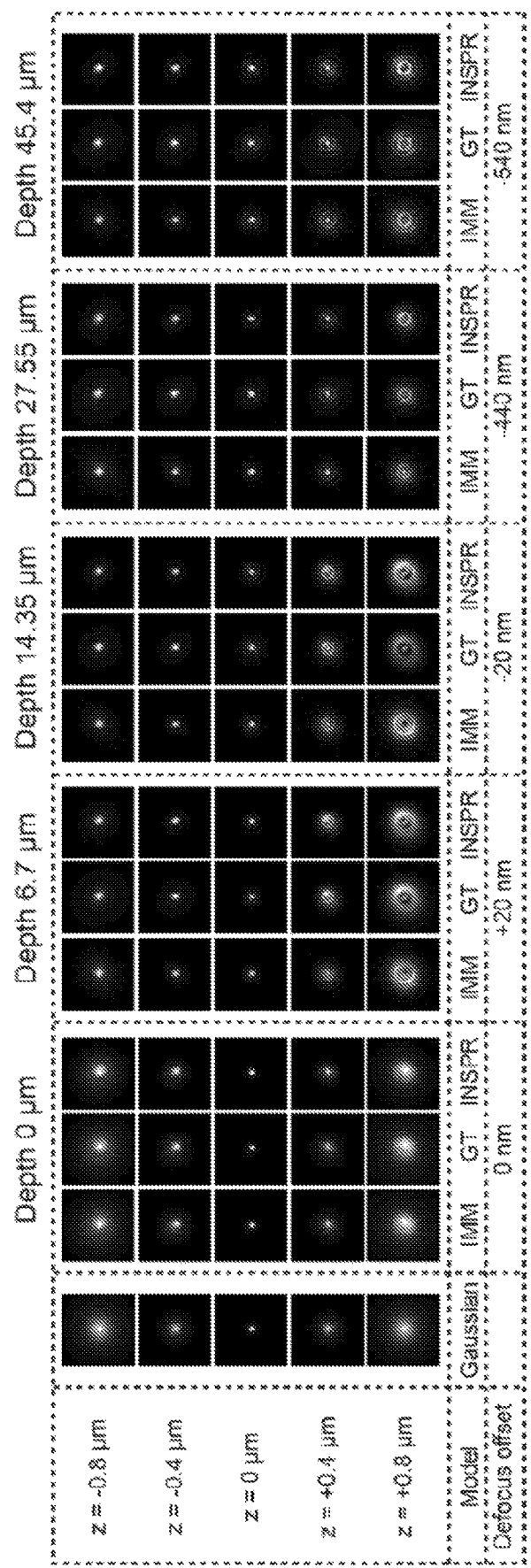
FIG. 2f provides 3D PSFs when using different models such as Gaussian, INSPR, and IMM in comparison to ground truth (GT).

Next, the accuracy of INSPR is shown by retrieving a known wavefront distortion from a library of single molecule emission patterns simulated randomly within an axial range of ±800 nm, as shown in FIG. 2a (which shows a simulated biplane single molecule emission patterns located randomly over an axial range from −800 to +800 nm with a known wavefront distortion). The known wavefront shape includes 21 Zernike modes (Wyant order, from vertical astigmatism to tertiary spherical aberration) with their amplitudes randomly sampled from −1 to +1 (unit: $\lambda/12\pi$). The INSPR method described herein has successfully retrieved the in situ pupil with a phase error of 15±6 m$\lambda$ (30 trials) as shown in FIG. 2b (which shows the phase of the in situ pupil retrieved by INSPR (identified as "in situ pupil"), ground truth, and the residual error (representing 15.6 m$\lambda$)), and a Zernike amplitude error of 11±4 m$\lambda$ (30 trials) for the total 21 modes as shown in FIG. 2c (which shows amplitudes of 21 Zernike modes (Wyant order, from vertical astigmatism to tertiary spherical aberration) decomposed from the in situ pupil retrieved by INSPR (shown as diamonds), with an RMSE of 11.1 m$\lambda$ for the total 21 modes compared with ground truth (shown as circles)). The resulting PSFs generated by the in situ pupil show high degree of similarity with those generated by the known pupil, as shown in FIG. 2d (which shows x-y and x-z views of the INSPR retrieved PSFs, showing high degree of similarity with those generated by the known pupil function (i.e., ground truth)). The performance is further tested through retrieving a previously estimated wavefront distortion at various imaging depths above the coverslip, up to ~45 µm as shown in FIG. 2e (which shows similarity of the 3D PSFs at different imaging depths when using INSPR (circles), Gaussian model (stars), and theoretical index mismatch model (IMM, squares)). For each depth, the reference 3D PSFs were simulated according to the previously measured aberrations with an axial range from −800 to +800 nm and a step size of 100 nm. Three models were then used to generate 3D PSFs in the same axial range with different axial offsets. For each depth, 3D normalized cross correlation (NCC) coefficients between the reference PSFs and PSFs generated by three models at different axial offsets are shown with the maximum values marked (diamonds). At the depth of 0 µm, the maximum NCC of INSPR is closer to that of IMM, compared with Gaussian. As the depth increases, it remains around 0.95, higher than those of Gaussian and IMM), and FIG. 2f (which shows 3D PSFs when using different models such as Gaussian, INSPR, and IMM in comparison to ground truth (GT)). PSFs shown are chosen from the maximum NCC (diamonds) for each depth in FIG. 2e. The PSFs retrieved by INSPR show higher similarity with ground truth, in comparison to those retrieved by IMM. The defocus offset (i.e., the axial shift from the actual focal plane) was obtained by finding the maximum-intensity plane of ground truth PSFs along the axial direction). INSPR enables retrieval of these in situ PSFs that vary significantly throughout the depths (0, 6.7, 14.35, 27.55, and 45.4 µm). While these highly-distorted wavefronts make decomposition into Zernike modes unreliable due to phase wrapping, the normalized cross correlation coefficients between the retrieved in situ PSF and the known response can be consistently maintained above 0.95 at each tested depth within a relatively large axial range (±800 nm), as shown in FIG. 2e.

Figure 2G:
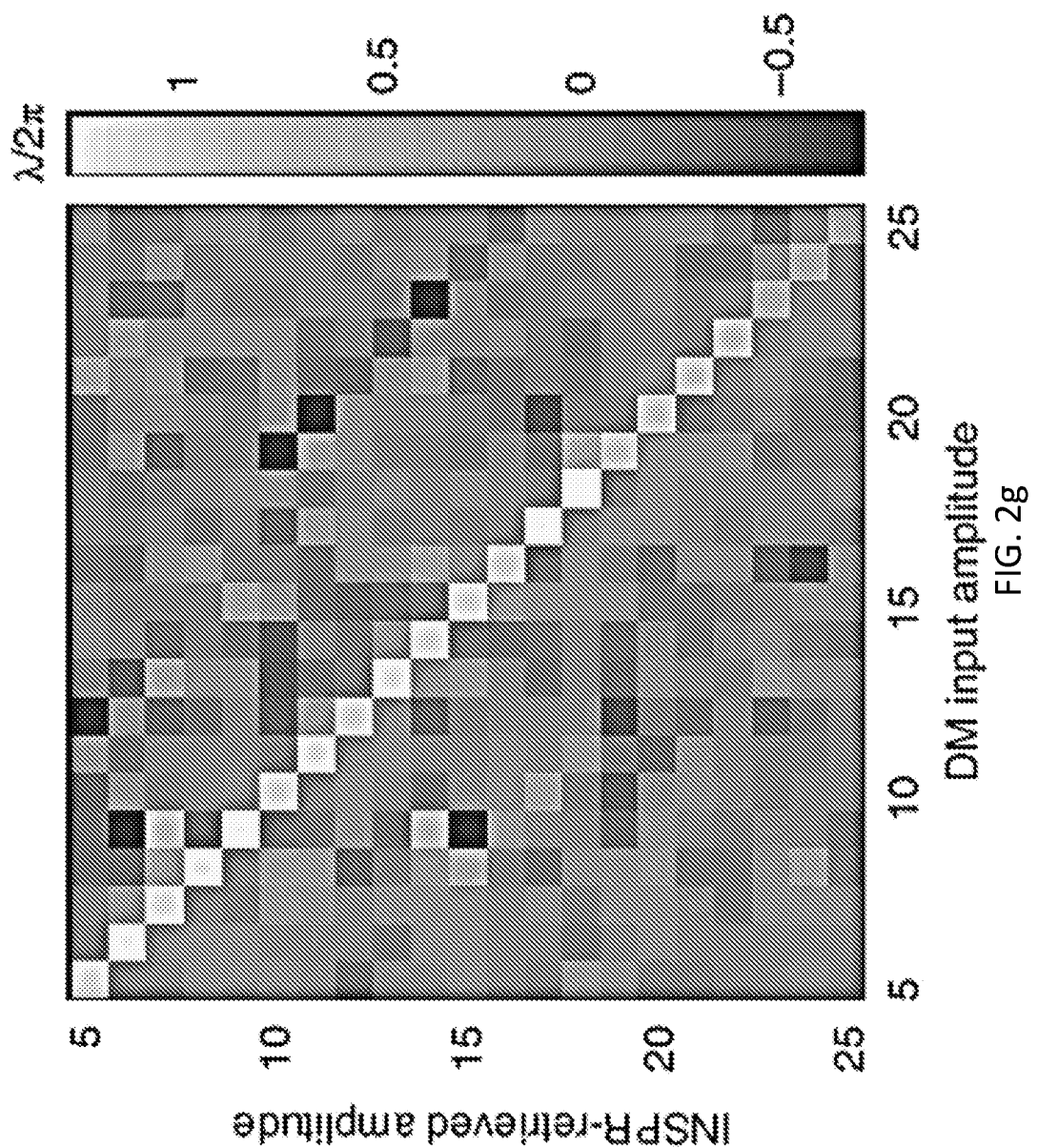
FIG. 2g is a heat map showing the relationship between the deformable mirror input and INSPR retrieved amplitudes of 21 Zernike modes. Compared with the amplitudes of the aberrations input by the deformable minor along the diagonal elements, INSPR results in 8% estimation error for the first 18 Zernike modes, and 41% error for the last 3 tertiary aberration modes.

By inserting a deformable mirror in the pupil plane (also known as the Fourier plane) of the microscope, as shown in FIG. 1a, controllable wavefront distortions can be introduced mimicking situations when imaging through whole-cell and tissue specimens, as shown in FIG. 1a. The deformable mirror is calibrated to introduce individual Zernike-based aberration modes ranging from commonly experienced astigmatism and coma to high-order modes such as tertiary spherical aberration. Single molecule blinking datasets were acquired in COS-7 cells by visualizing immuno-labeled mitochondrial marker TOM20 through DNA-PAINT (DNA point accumulation for imaging in nanoscale topography). The introduced aberrations distorted the single molecule emission patterns detected on the camera, which were then fed into INSPR to retrieve the in situ PSF and its corresponding pupil function. By comparing the aberration amplitudes induced by the deformable mirror with those retrieved by INSPR, as shown in FIG. 2g (which is a heat map showing the relationship between the deformable mirror input and INSPR retrieved amplitudes of 21 Zernike modes. Compared with the amplitudes of the aberrations input by the deformable mirror along the diagonal elements, INSPR results in 8% estimation error for the first 18 Zernike modes, and 41% error for the last three tertiary aberration modes). As a result, INSPR provides accurate estimations for the first 18 Zernike modes (Wyant order, 8% error compared to the phase retrieval result using beads in vitro, as shown in FIG. 2g) with a performance decrease in the last 3 tertiary aberration modes (41% error). This result demonstrates the capability of INSPR in retrieving distorted in situ PSFs directly from single molecule data obtained in cellular contexts.

Figure 2H:
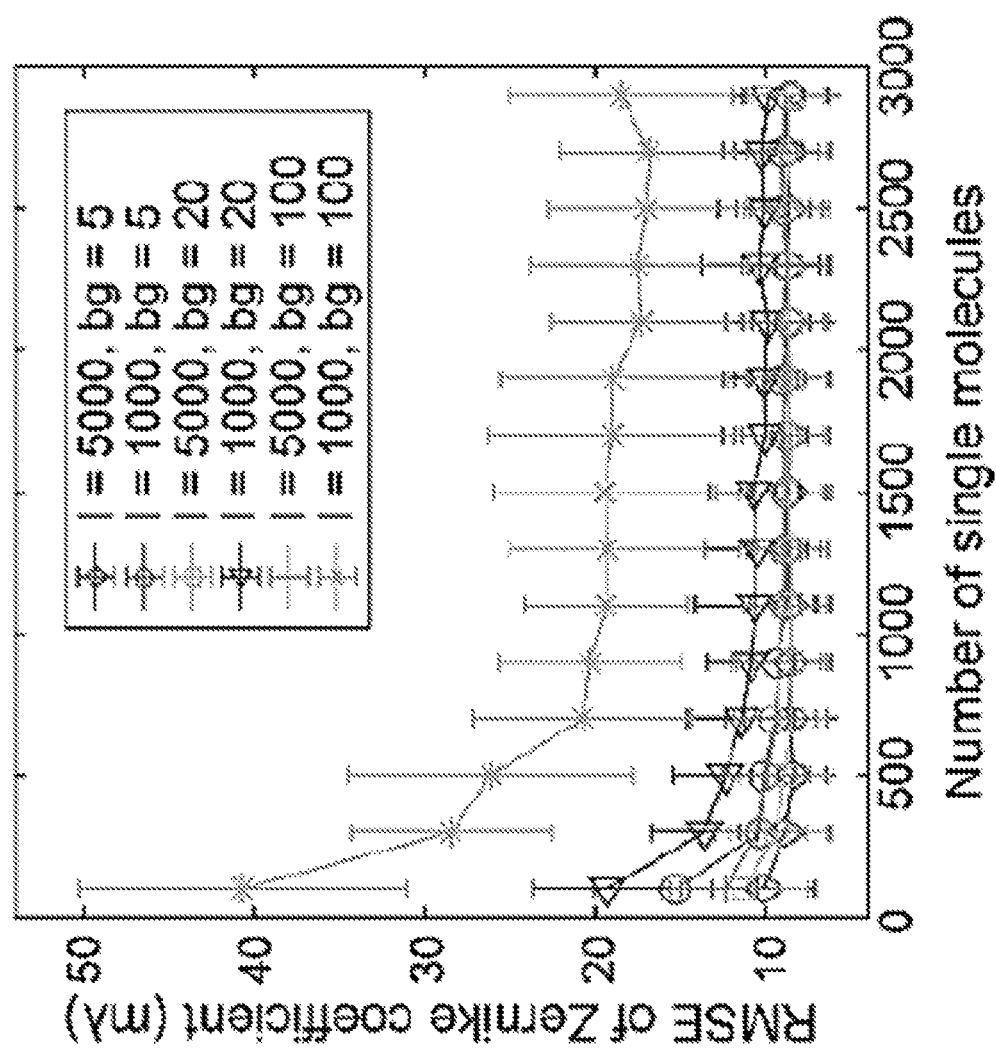
FIG. 2h is a graph of RMSE of Zernike coefficients between the in situ model and ground truth in different photon and background conditions. In each condition, data were simulated with Zernike coefficients randomly sampled from −1 to +1 (unit: λ/2π) in each trial (11 trials in total).

INSPR depends on the stochastic switching of single molecules to reconstruct the underlying PSF. Consequently, its convergence rate, i.e. the number of emission patterns needed for a stable reconstruction (e.g., convergence criteria: Zernike amplitude error <0.02λ), depends on the signal to background ratio (SBR) of the detected emitters, as shown in FIG. 2h (which is a graph of RMSE of Zernike coefficients between the in situ model and ground truth in different photon and background conditions. In each condition, data were simulated with Zernike coefficients randomly sampled from −1 to +1 (unit: $\lambda/2\pi$) in each trial (11 trials in total)). As the number of single molecules increases, RMSE converges to the stable estimation. High SBR cases require less than 300 single molecules, while low SBR cases require more than 2100 single molecules). In high SBR cases, a condition usually encountered when using specific labeling methods such as DNA-PAINT or bright organic probes such as Alexa Fluor 647, INSPR requires less than 300 emission patterns to converge. In contrast, INSPR requires more than 2100 emission patterns in low SBR cases, a common condition for live-cell single-molecule experiments with fluorescent proteins such as mEos3.2. For fixed-cell imaging, INSPR requires a relatively small number of emission patterns to converge when compared to the total obtained single molecule patterns. However, for live-cell imaging, the required number of emission patterns might limit the temporal resolution of INSPR when rapid temporal variation of wavefront distortion is sought.

INSPR enables measurement and compensation of sample-induced distortions within the actual imaging volume, as well as capturing its evolution throughout a thick specimen. The conventional methods rely on the PSF model generated by using fluorescent beads attached on a coverslip surface and use it to localize single molecule emission events at all depths of a biological specimen (hereafter referred as the in vitro approach). To the contrary, INSPR builds a specific in situ PSF model from the acquired single molecule dataset in each optical section and uses this model to localize the emission events in the corresponding section with high accuracy.

Figure 3A:
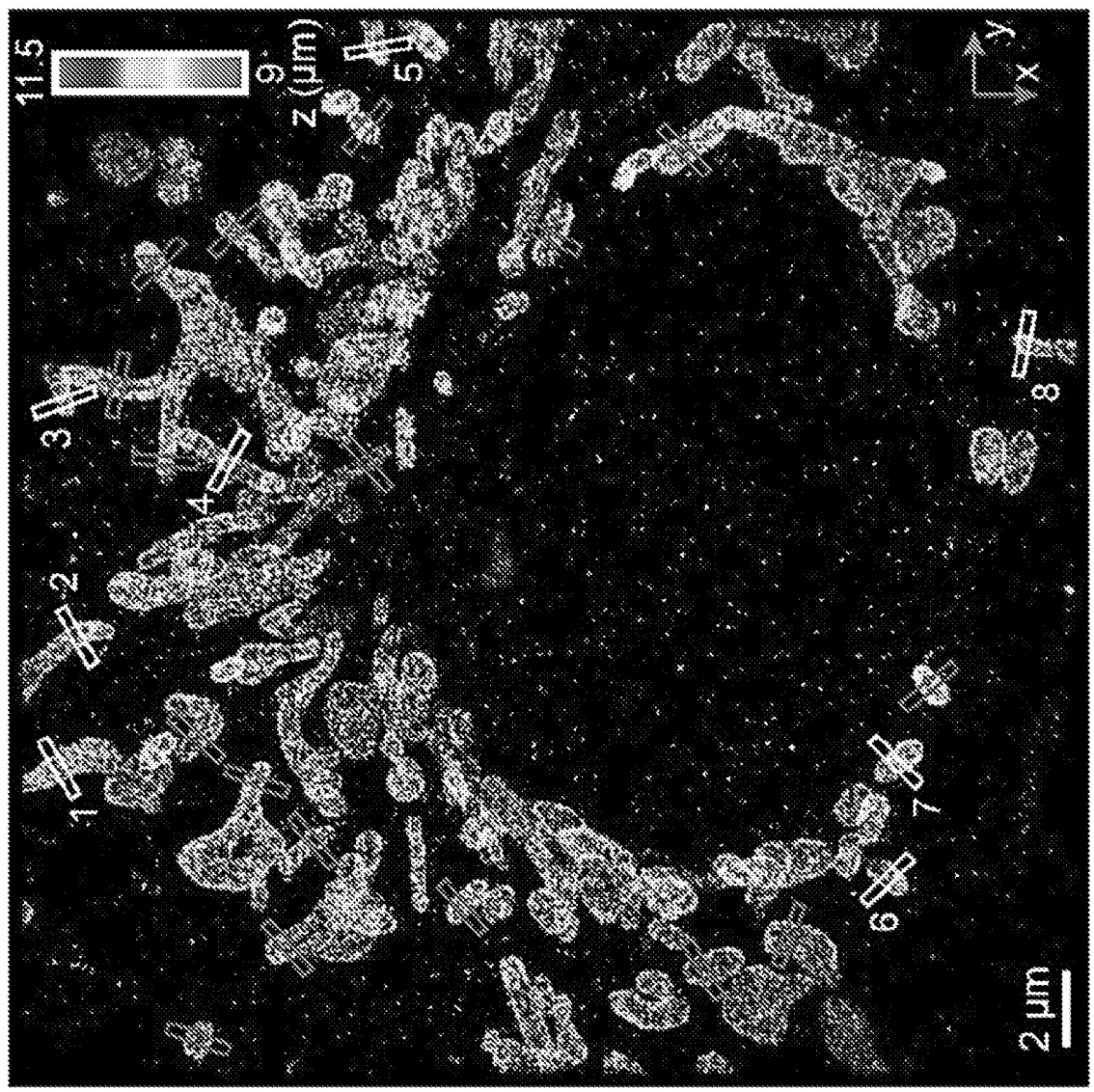
FIG. 3a is an x-y overview of the mitochondrial network showing the positions of 25 typical outer membrane contours as indicated by the boxed regions as a comparison of 3D reconstructions of the mitochondrial network labeled with TOM20 and the retrieved 3D PSFs using INSPR and the in vitro method.
Figure 3C:
FIGS. 3b and 3c are x-z and y-z slices along the dashed lines shown in FIG. 3a, respectively, where individual TOM20 clusters are revealed distinctly.
Figure 3B:
Figures 3D, 3E, 3F, 3G, 3H, 3I, 3J, 3K:
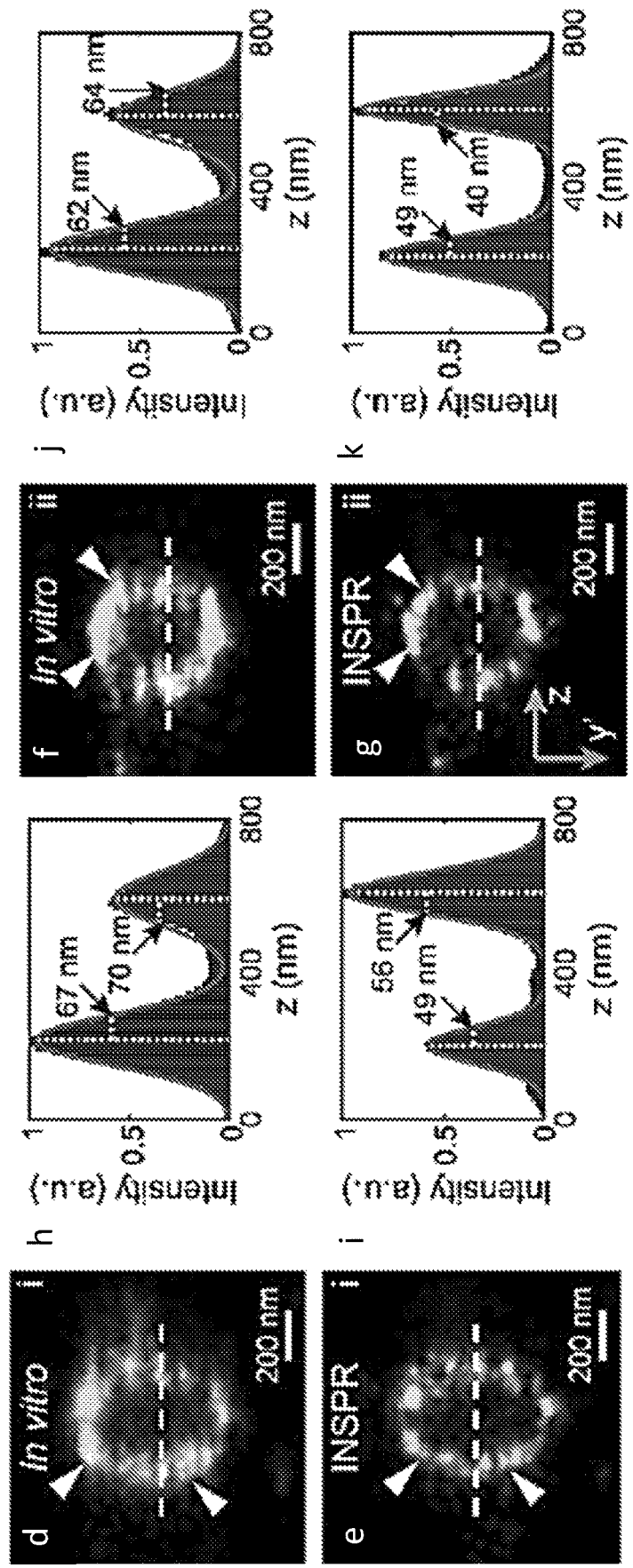
FIGS. 3d-3k (i.e., 3d, 3e, 3f, 3g, 3h, 3i, 3j, and 3k) are enlarged y'-z views of the outer membrane structures in areas i (3d and 3e) and ii (3f and 3g) as indicated by the white-boxed regions in 3a, and their intensity profiles along the z direction (3h-3k). The surface contour of each organelle is resolved by INSPR with high resolution in all three dimensions (3e and 3g), while reconstructions using the in vitro approach exhibit artifacts (3d and 3f, as highlighted by arrowheads).
Figure 3I:
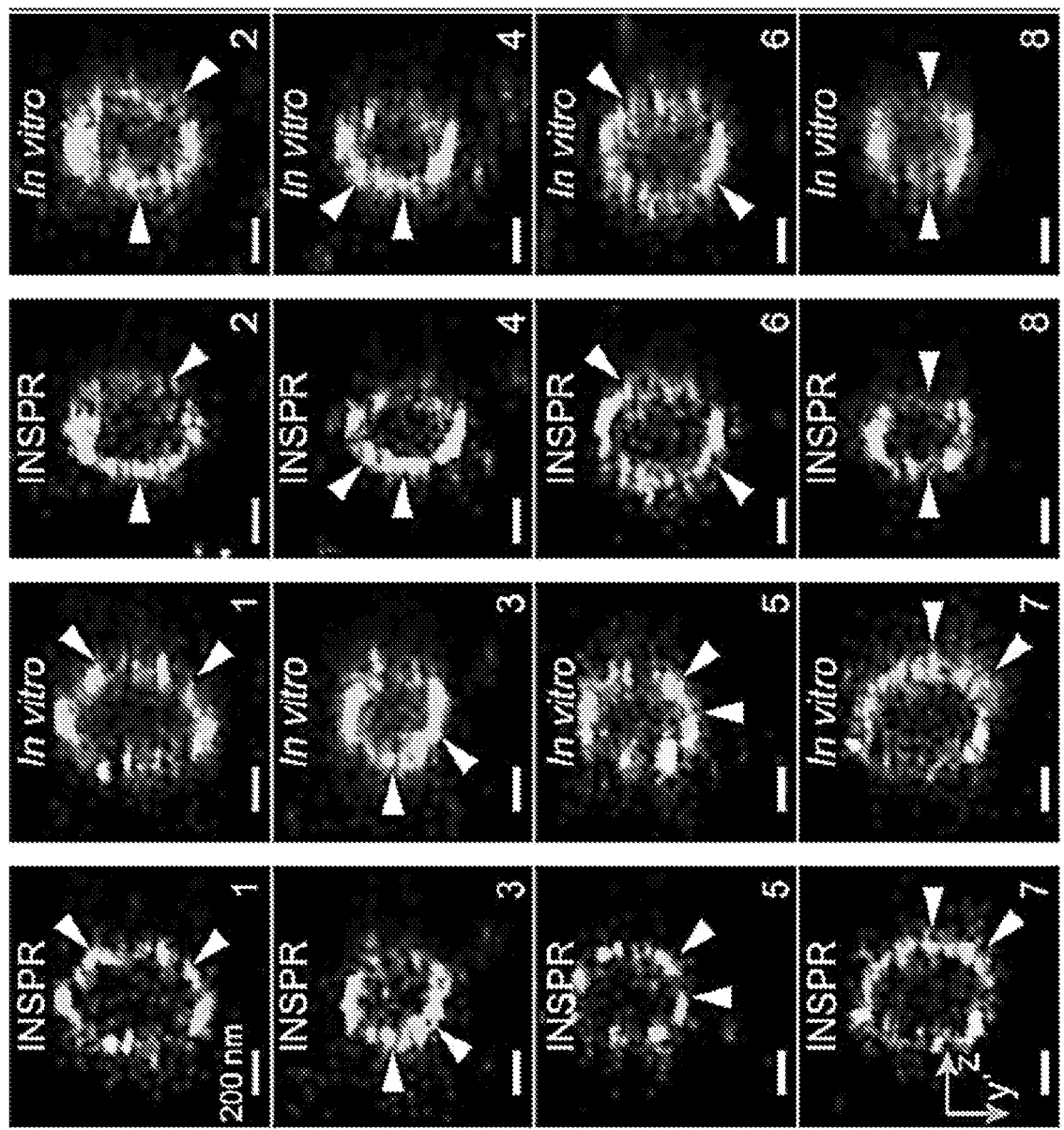
Figure 3M:
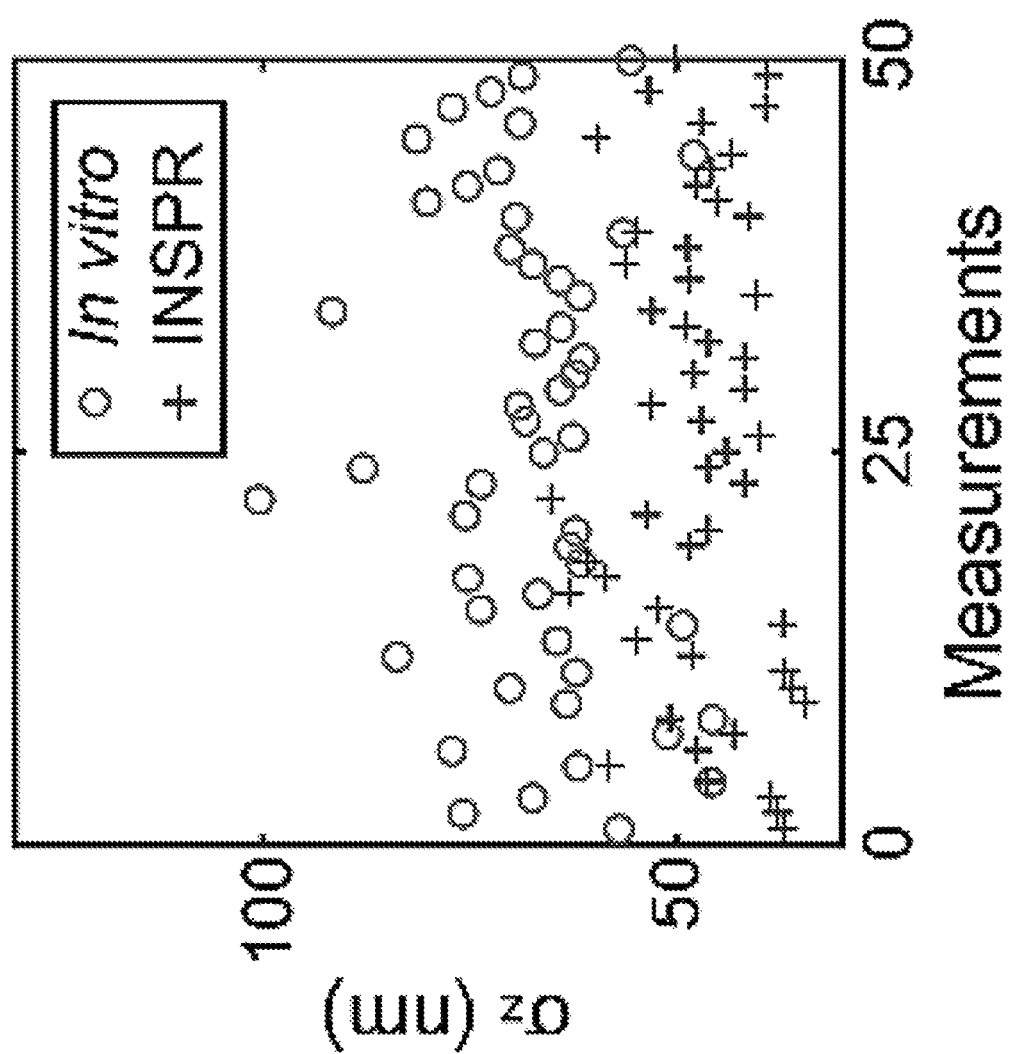
Figure 3N:
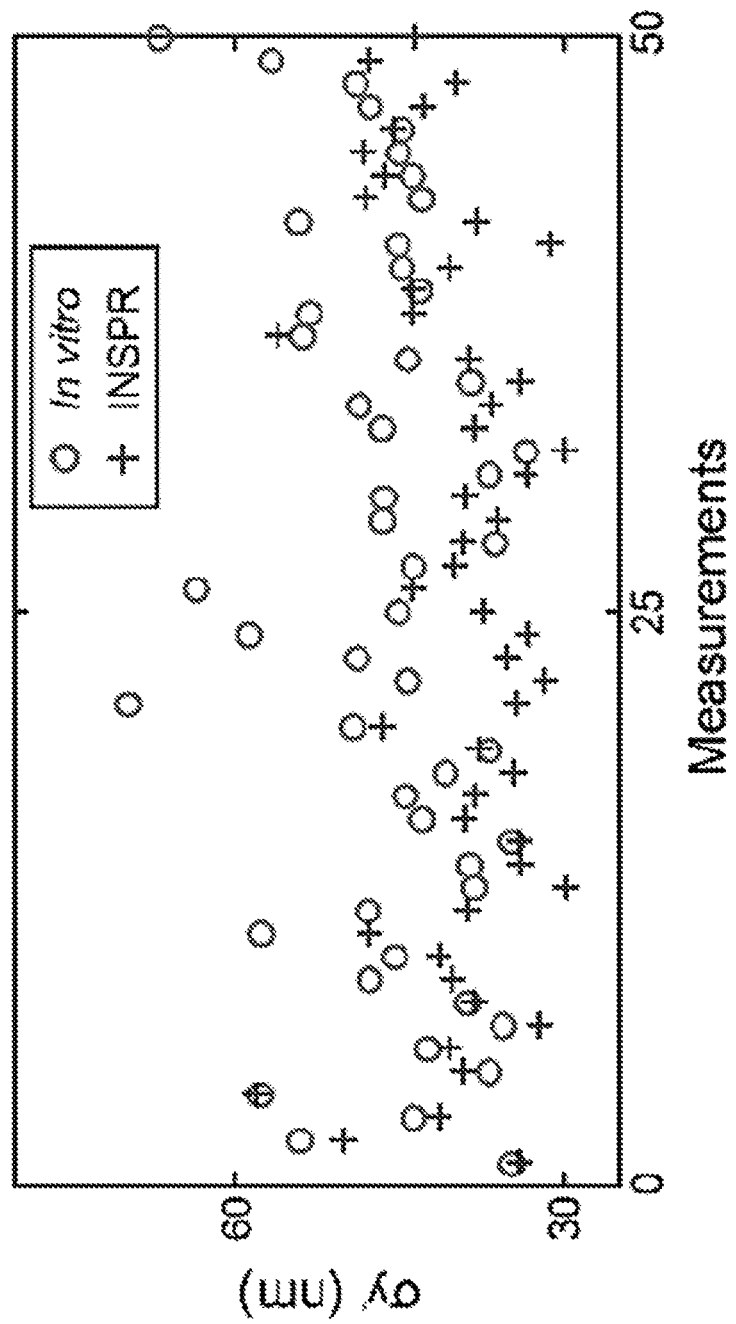
FIG. 3n is a distribution of $\sigma_{y'}$ obtained from the intensity profiles of 25 typical outer membranes in FIG. 3a, which demonstrates an improvement in the lateral resolution achieved by INSPR (plus signs) in comparison to the in vitro approach (circles).

To demonstrate the efficacy of the INSPR method of the present disclosure, immuno-labeled TOM20 protein, a protein complex located in the outer membrane of mitochondria, was imaged in COS-7 cells, as shown in FIG. 3a (which is an x-y overview of the mitochondrial network showing the positions of 25 typical outer membrane contours as indicated by the boxed regions as a comparison of 3D reconstructions of the mitochondrial network labeled with TOM20 and the retrieved 3D PSFs using INSPR and the in vitro method). To investigate the feasibility of INSPR when imaging above the coverslip surface, a 9-μm-thick sample cavity was fabricated filled with a water-based imaging medium between two coverslips, with the immuno-labeled cells on the upper coverslip. A volume of ~30 μm×30 μm×2.5 μm within a COS-7 cell was imaged. The interconnected mitochondrial network can be clearly resolved with high resolution by using INSPR as shown in FIG. 3a, where the horizontal and vertical cross sections reveal individual TOM20 clusters distinctly as shown in FIGS. 3b and 3c (which are x-z and y-z slices along the dashed lines shown in FIG. 3a, respectively, where individual TOM20 clusters are revealed distinctly. The thickness of these axial slices along the third dimension is 200 nm). Examining reconstructions of the same field of view from both INSPR and the conventional in vitro approach, INSPR is capable of resolving the surface contour of each organelle with high resolution in all three dimensions whereas reconstructions using the in vitro approach exhibit both artifacts and decreased resolution in these examined cross sections, as shown in FIG. 3d-3k (which are enlarged y'-z views of the outer membrane structures in areas i (3d and 3e) and ii (3f and 3g) as indicated by the white-boxed regions in 3a, and their intensity profiles along the z direction (3h-3k). The surface contour of each organelle is resolved by INSPR with high resolution in all three dimensions (3e and 3g), while reconstructions using the in vitro approach exhibit artifacts (3d and 3f, as highlighted by arrowheads). Intensity profiles of these outer membrane contours show higher resolution achieved by INSPR (3i and 3k) compared with the in vitro approach (3h and 3j). Here the orientation of the cross section is rotated to allow projection of the 3D membrane bounded structures to the 2D image, and FIG. 3l which are additional enlarged y'-z views of the outer membrane structures as indicated by the numbered white-boxed regions in 3a, shows the reconstructed images using INSPR (left) and the in vitro (right) approach. Here the orientation of the cross section is rotated to allow projection of the 3D membrane bounded structures to the 2D image. Intensity profiles of 25 typical outer membrane contours (positions shown in FIG. 3a) demonstrate a consistent improvement in resolution achieved by INSPR in comparison to the in vitro approach as shown in FIG. 3m (which is a distribution of $\sigma_z$ obtained from the intensity profiles of 25 typical outer membranes in FIG. 3a). INSPR results are marked with plus signs and the in vitro results are marked with circles), and FIG. 3n (which is a distribution of $\sigma_{y'}$ obtained from the intensity profiles of 25 typical outer membranes in FIG. 3a, which demonstrates an improvement in the lateral resolution achieved by INSPR (plus signs) in comparison to the in vitro approach (circles)). The achieved mean precision is about 8 nm in lateral and about 21 nm in axial dimensions as estimated by the CRLB.

Figure 3O:
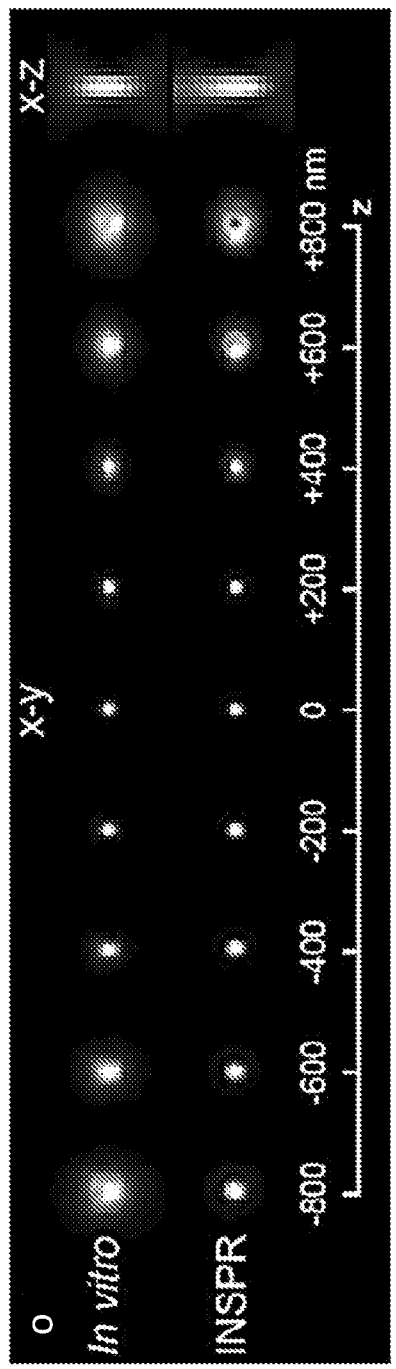
FIG. 3o provides x-y and x-z views of the PSFs generated by the INSPR model of the deepest (furthest) section above the bottom coverslip and those generated by the in vitro model.
Figure 3P:
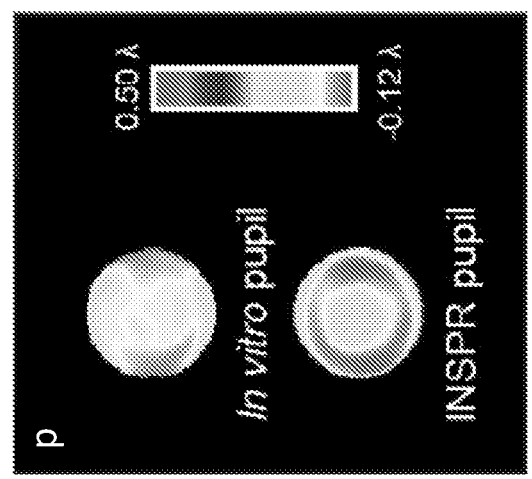
FIG. 3p provides phase of the INSPR pupil and the in vitro pupil corresponding to PSFs as shown in FIG. 3o.
Figure 3Q:
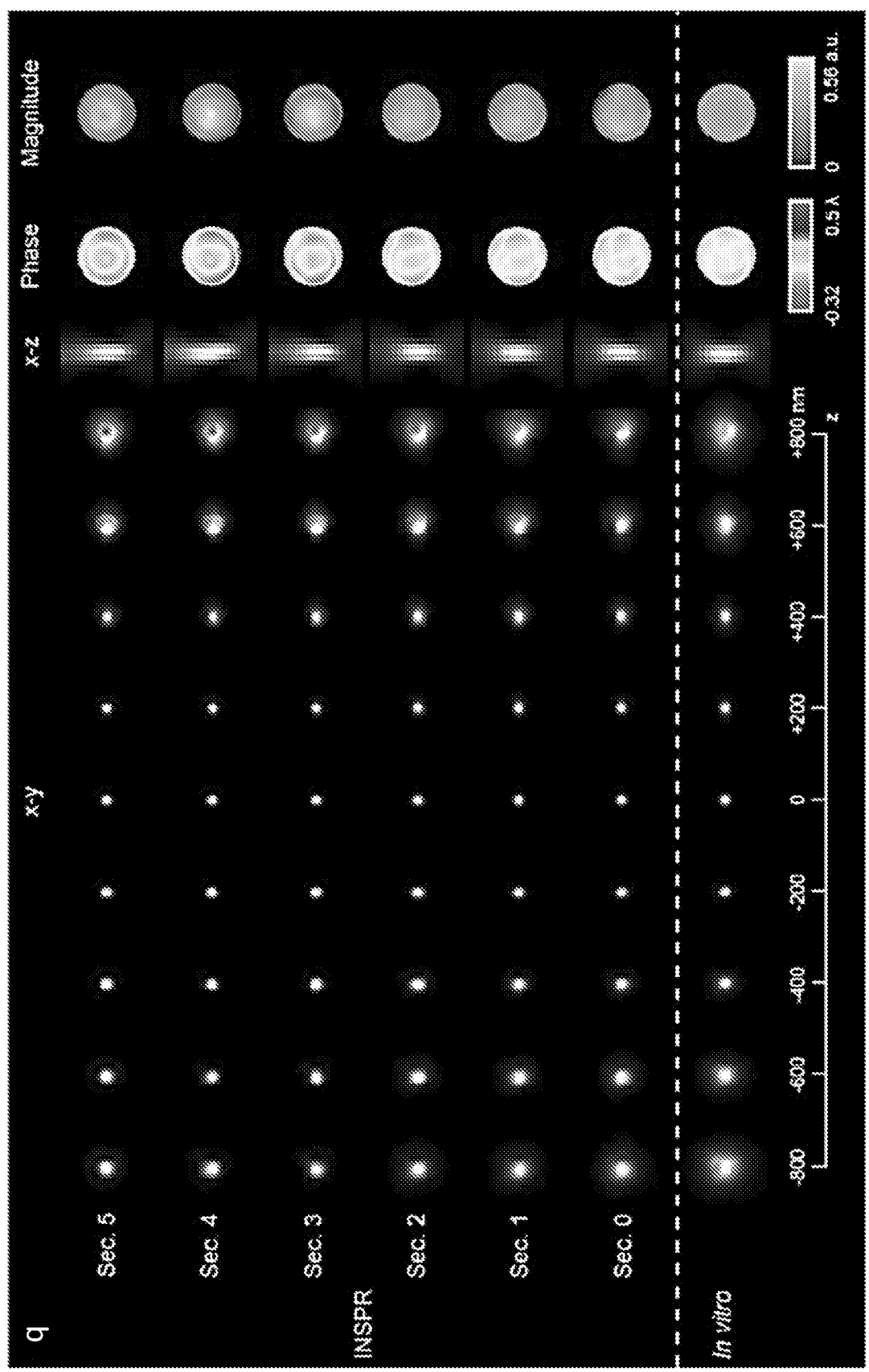
FIG. 3q provides the x-y and x-z views of the PSFs generated by the INSPR models of different sections and those generated by the in vitro model, as well as the phase and magnitude of the corresponding pupils.
Figure 3S:
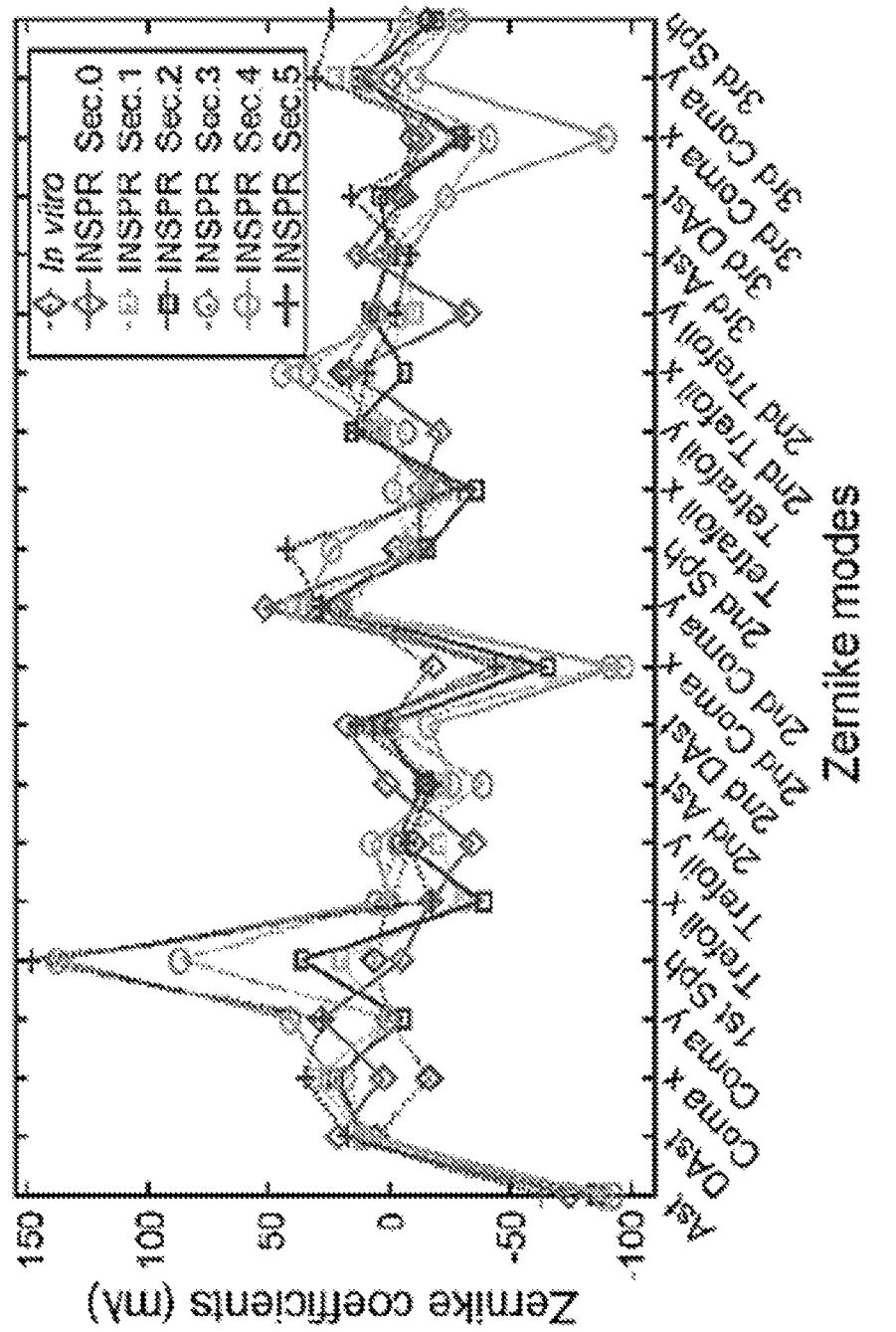
FIG. 3s provides amplitudes of 21 Zernike modes (Wyant order, from vertical astigmatism to tertiary spherical aberration) decomposed from the INSPR and in vitro pupils.

To further explain this difference, the in situ PSF models retrieved by INSPR are compared with the in vitro one as shown in FIG. 3o which are x-y and x-z views of the PSFs generated by the INSPR model of the deepest (furthest) section above the bottom coverslip and those generated by the in vitro model. The axially stretched PSFs retrieved by INSPR show the existence of sample-induced aberrations when imaging deep into the cell, which cannot be observed by imaging fluorescent beads on a coverslip surface. FIG. 3p shows the phase of the INSPR pupil and the in vitro pupil corresponding to PSFs as shown in FIG. 3o. The INSPR pupil shows sample-induced aberrations together with instrument imperfections, while the in vitro pupil can characterize instrument imperfections but fails to reflect sample-induced aberrations. FIG. 3q shows the x-y and x-z views of the PSFs generated by the INSPR models of different sections and those generated by the in vitro model, as well as the phase and magnitude of the corresponding pupils. As the imaging depth increases, the axially stretched PSFs retrieved by INSPR show the existence of sample-induced aberrations, which cannot be characterized by the in vitro model. FIG. 3s shows the amplitudes of 21 Zernike modes (Wyant order, from vertical astigmatism to tertiary spherical aberration) decomposed from the INSPR and in vitro pupils. As the imaging depth increases, the INSPR pupils and their corresponding Zernike amplitudes show a progressive increase of major aberrations such as spherical and coma, while the PSF retrieved from fluorescent beads can only characterize instrument imperfections but fails to reflect sample-induced aberrations and their depth-dependent variations due to its in vitro nature. As the imaging depth increases, the amount of sample-induced aberrations from optical sections does so accordingly. The in situ pupils retrieved by INSPR (as shown in FIGS. 3$p$ and 3$q$), together with their decomposed Zernike amplitudes (as shown in FIG. 3$s$), faithfully reflect this phenomenon as a progressive increase of major aberrations such as spherical and coma with the increasing depths. This is also shown in the axially stretched PSFs retrieved by INSPR (as shown in FIGS. 3$o$ and 3$q$). In contrast, the PSF retrieved from fluorescent beads successfully characterizes instrument imperfections but fails to take into account sample-induced aberrations and their depth-dependent variations due to its in vitro nature.

To better demonstrate the INSPR method of the present disclosure, the following theoretical discussion is provided. According to scalar diffraction theory, the point spread function (PSF) of an imaging system can be calculated from the Fourier transform of the pupil function as:

$$\mu_0(x,y,z) = | \mathcal{F} [P(k_x,k_y)e^{i2\pi k_z z}]|^2$$

where $\mu_0$ (x, y, z) describes the PSF at position (x, y, z) in the sample space. $\mathcal{F}$ denotes the Fourier transform operator, and $P(k_x,k_y)$ is the pupil function at the back focal plane of the objective lens. The size of the pupil function is limited by $$k_x^2 + k_y^2 \leq \left(\frac{NA}{\lambda}\right)^2,$$

where NA is the numerical aperture of the objective lens and $\lambda$ is the emission wavelength of the photon emitted by the single molecule. The defocus phase is described by the factor $e^{i2\pi k_z z}$, where $$k_z = \sqrt{\left(\frac{n}{\lambda}\right)^2 - k_x^2 - k_y^2},$$

and n is the refractive index of the immersion medium.

The pupil function can be expressed as $P(k_x, k_y) = A(k_x, k_y) \cdot e^{i\Phi(k_x,k_y)}$, where $A(k_x,k_y)$ and $\Phi(k_x, k_y)$ are the amplitude and phase of the electric field at the pupil plane, respectively. $\Phi(k_x, k_y)$ describes the optical aberrations introduced by instrument imperfection and the local biological context, which can be decomposed into a series of Zernike modes as $\Phi(k_x, k_y) = \sum_{n=1}^{N} c_n Z_n(k_x, k_y)$, where $Z_n(k_x, k_y)$ is the nth Zernike mode, $c_n$ is its corresponding coefficient, and N is the number of Zernike modes. In showing effectiveness of the INSPR method of the present disclosure, N was set 25. Among these 25 Zernike modes, piston, x-tilt, and y-tilt do not influence the shape of the PSF, and defocus depends on the axial position, the rest 21 Zernike modes (Wyant order, from vertical astigmatism to tertiary spherical aberration) were considered.

INSPR Includes Three Key Components: PSF Library Construction, PSF Library Assignment, and 3D Model Estimation, which are Explained as Follows.

PSF library construction. For biplane setup, the PSF library was constructed from the single molecule dataset, including pairs of emission patterns at random depths in a certain axial range. The raw dataset from two planes was first aligned to the same regions of interest (biplane registration), and then cropped into individual sub-regions containing single emitters (segmentation). For astigmatism-based setup, the PSF library was directly segmented from the raw dataset. This process includes the following two steps: 1. Biplane registration. For biplane setup, images in plane 1 were treated as reference, and images in plane 2 were aligned to plane 1 using affine transformation (including translation, scale, shear, and rotation). Transformation between two planes can be obtained either by imaging 10-15 fluorescent beads on the coverslip with an axial range from −1 to +1 µm with a step size of 100 nm (50 frames in each step), or by collecting a single molecule blinking dataset (1000 or 2000 frames). The image sequences of beads or blinking dataset in two planes were individually projected into the lateral plane by maximum-intensity projection. Then the affine matrix was calculated based on these projection images in two planes (using 'imregtform' function in MATLAB), and registered the images in plane 2 to plane 1 according to the affine matrix (using 'imwarp' function in MATLAB). For astigmatism-based setup, this step was ignored. 2. Segmentation. For biplane setup, after summing the images from registered planes, sub-regions with single molecules were cropped using a segmentation algorithm, where two uniform filters with different kernel sizes were used to reduce noise, and a maximum filter was used to find local maximum intensities. The positions of these maximum intensities were localized at the centers of candidate sub-regions. Two intensity thresholds (initial intensity threshold $I_{init}$ and segmentation threshold $I_{seg}$) were utilized and a distance threshold ($d_{thresh}$) to make sure that each selected sub-region only contains one molecule with enough brightness. First, the candidate sub-regions were selected if their maximum intensities were higher than $I_{init}$. Second, the overlapping molecules were rejected if the centers of two sub-regions were closer than $d_{thresh}$. Third, the maximum intensities of the rest sub-regions were filtered out if they were below $I_{seg}$. For distorted wavefront control, we set the sub-region size to 40×40 pixels, $d_{thresh}$ to 28, $I_{init}$ to 30, and $I_{seg}$ ranging from 35 to 90 in order to get ~5000 single molecules. For in situ model estimation, we set the sub-region size to 32×32 pixels, $d_{thresh}$ to 26, $I_{init}$ to 25, and $I_{seg}$ to 40. For 3D single-molecule localization, we set the sub-region size to 16×16 pixels, $d_{thresh}$ to 10, $I_{init}$ to 25, and $I_{seg}$ to 40. For datasets acquired in the astigmatism-based setup, single molecules were directly cropped from the raw dataset. The sub-regions of single molecules in adjacent optical sections were merged to increase the axial range. We set the sub-region size to 32×32 pixels, $d_{thresh}$ to 26, $I_{init}$ to 25, and $I_{seg}$ to 40 for in situ model estimation, and the sub-region size to 16×16 pixels, $d_{thresh}$ to 10, $I_{init}$ to 25, and $I_{seg}$ to 40 for 3D single-molecule localization.

In single molecule localization techniques, improving the quality of the detected PSFs will improve the accuracy of in situ model estimation and 3D localization. This can be realized with combination of adaptive optics, tissue clearing and expansion methods, and light-sheet illumination approaches.

PSF library assignment. The detected PSFs in the library were assigned to temporary axial positions following three steps. First, the reference z-stack PSFs in two plane were generated from the initial/estimated pupil function. Second, the detected PSFs were classified into different groups based on their similarities with the reference PSFs. Third, 2D alignment was carried out by calculating the shift distance between detected PSFs and the most similar reference PSFs.

Towards this end, template PDFs were generated from the initial/estimated pupil function, which was a constant pupil in the first iteration, and iteratively optimized in assignment and update steps. For biplane setup, INSPR generated k templates in each plane with an axial range from −1.4 to +1.4 μm ($T_{bp}$={(PSF'$_{1,1}$, PSF'$_{1,2}$), (PSF'$_{2,1}$, PSF'$_{2,2}$), . . . , (PSF'$_{k,1}$, PSF'$_{k,2}$)}), which is sufficient to cover all the detected PSFs. The axial step size of the templates $d_t$ was set to δ/2 or δ/4, δ is the biplane distance. The setting of the axial step size makes the templates generated from the pupil function of each plane overlap around the center of the axial range. For simulations in biplane setup, we set δ to 580 nm and $d_t$ to δ/4 (145 nm). For distorted wavefront control, δ was obtained from measurement as 580 nm, and we set $d_t$ to δ/4 (145 nm). For the dataset (TOM20), δ was obtained from measurement and rescaling as 286 nm, and we set $d_t$ to δ/2 (143 nm). For other datasets, δ was obtained from measurement and rescaling as 558 nm and we set $d_t$ to δ/4 (139 nm). For simulations and datasets in the astigmatism-based setup, the templates were generated at axial positions from −1 to +1 μm, with a step size of 100 nm. We set the amplitude of vertical astigmatism to +1.5 (unit: λ/2π) for simulation and +1.2 (unit: λ/2π) for experimental data as initial guess.

For Biplane Setup, Each Pair of Detected Single Molecules in PSFs Library ($X_{bp}$={(PSF$_{1,1}$, PSF$_{1,2}$), (PSF$_{2,1}$, PSF$_{2,2}$), . . . , (PSF$_{n,1}$, PSF$_{n,2}$)}) (Also Referred Herein as Sub-PSFs) was Assigned to a Certain Template Group with the Highest Similarity. The Similarity is Defined as $$Sim(PSF_j, PSF'_j) = 1/2[NCC(PSF_{j,1}, PSF'_{i,1}) + NCC(PSF_{j,2}, PSF'_{i,2})],$$

where NCC is the normalized cross correlation between detected PSFs and templates in each plane. The value of NCC varies from −1 to +1, where high NCC represents high similarity between detected PSFs and templates. Therefore, each detected PSF in the library was classified into a certain template group, which formed k group sets S={$S_1, S_2, \ldots, S_k$}. Similarity threshold $Sim_{min}$ and number threshold $N_g$ were used to select high-similarity PSFs in each group, where PSFs with a similarity lower than $Sim_{min}$ or groups with PSFs fewer than $N_g$ were rejected. For simulations, $Sim_{min}$ was set to 0.5, and $N_g$ was set to range from 5 to 30. For distorted wavefront control, $Sim_{min}$ was set to 0.5 or 0.6, and $N_g$ to 15 or 25. For other datasets acquired in the biplane setup, $Sim_{min}$ was set to 0.6, and $N_g$ to 30. For the datasets acquired in the astigmatism-based setup, each detected single molecule was assigned to a certain template group. $Sim_{min}$ was set to 0.6, and $N_g$ to 50.

For each detected PSF, 2D cross correlation was used to calculate the shift distance with its corresponding template. To find the correlation peak from the 2D cross correlation image, Fourier interpolation with 10 times up sampling was used to identify the peak with a sub-pixel size of 12 nm. Then the detected PSF was aligned to its template according to the shift distance. Here two shift modes were used in the biplane setup. (1) XY_shift_mode='separate shift', meaning that the shift distance was calculated individually for each plane, and the PSFs were aligned to their corresponding templates separately. This mode was used in simulation and distorted wavefront control. (2) XY_shift_mode='together shift', meaning that the shift distances were calculated together for two planes, and the PSFs of two planes were aligned to the corresponding pair of templates. This mode is more robust especially for data with low SBR, so it was used for experimental data. The biplane configuration was used to avoid degeneracies. The framework of INSPR can be also generalized to other configurations, such as using a phase mask to generate non-degenerate PSF shapes or using a cylindrical lens with prior knowledge (e.g. positive vertical astigmatism aberrations.

3D model estimation. The classified PSFs in each group were averaged to improve SBR, and then re-arranged by their axial positions. The phase retrieval method was carried out to estimate a new pupil function, which described the in situ 3D model and was used to generate reference z-stack PSFs in 'PSFs library assignment' section. First is group average: Here k group sets S={$S_1, S_2, \ldots, S_k$} were formed by PSFs library assignment. In each group, the assigned PSFs were similar to each other and aligned to the center of the template. In order to obtain high-contrast images, these assigned PSFs were first normalized by z-score normalization and then averaged together as $$PSF_{i,m}^{Ave} = Ave(\{PSF_{j,m} : j \in S_i\}), m=(1,2)$$

where Ave is the image average operation, $PSF_{i,m}^{Ave}$ is the averaged PSF of plane m in group i, and $PSF_{j,m}$ is the normalized PSF of plane m in the library. Thus 2k average images were obtained $A_{bp}$={($PSF_{1,1}^{Ave}$, $PSF_{1,2}^{Ave}$), ($PSF_{2,1}^{Ave}$, $PSF_{2,2}^{Ave}$), . . . , ($PSF_{k,1}^{Ave}$, $PSF_{k,2}^{Ave}$)}, and their axial positions $Z_{bp}$={($Z_{1,1}, Z_{1,2}$), ($Z_{2,1}, Z_{2,2}$), . . . ($Z_{k,1}, Z_{k,2}$)} for biplane setup. For astigmatism-based setup, we obtained k average images and their axial positions. Second, for biplane setup, the 2k averaged PSFs were re-arranged into an axial range from −1.4 to +1.4 μm. The PSFs with the same axial positions in two planes were merged together. Thus a 3D PSF stack was formed, which is usually from −1 to +1 μm with a step size of 100-200 nm. For astigmatism-based setup, this step was ignored.

Next pupil function was regenerated. The 3D PSF stack was used to generate the in situ 3D PSF model by phase retrieval (PR) method, which is based on Gerchberg-Saxon algorithm and outputs a pupil function to generate the retrieved PSFs within an axial range of about 2 μm. The PR process was carried out with a stack of averaged PSFs, their corresponding axial positions, and system parameters including the numerical aperture of the objective lens, the emission wavelength, the refractive index of the immersion medium, and the pixel size on the detection plane. Here two update modes (1) Z_shift_mode='shift'. In this mode, PR was carried out three times iteratively. For each time, PR found x tilt, y tilt, and defocus aberrations from decomposed Zernike modes and compensated these aberrations by shifting the lateral and axial positions of averaged PSFs. This mode was used in simulation, imaging experiments, and distorted wavefront control for low-order aberrations (from vertical astigmatism to secondary diagonal astigmatism except for the spherical aberration). (2) Z_shift_mode='no shift'. In this mode the positions were not updated. This mode was used in cases where wavefront distortions were significantly large, since the induced phase wrapping could make Zernike decomposition unreliable. In fact, PR is not the only way to estimate the 3D model in INSPR. Any model-estimation tools developed for single molecule localization, such as feature-based mapping, interpolation, and deep learning, can be utilized to build the 3D model in generalized INSPR.

Next, the INSPR method models the 3D PSFs through the pupil function. For the biplane configuration, the PSFs in each plane can be described as:

$$\begin{cases} \mu_1(x, y, z) = I_1 \cdot \mu_0(x, y, z) + bg_1 \\ \mu_2(x, y, z) = I_2 \cdot \mu_0(x, y, z + \delta) + bg_2 \end{cases},$$

where $\mu_1$ and $\mu_2$ represent the PSF models in two planes, $\mu_0(x, y, z)$ and $\mu_0(x, y, z+\delta)$ are normalized PSFs generated by the pupil function at positions $(x, y, z)$ and $(x, y, z+\delta)$, where $\delta$ is the biplane distance, $I_1$ and $I_2$ are the total photon counts, and $bg_1$ and $bg_2$ are the background counts.

The collected data from the sCMOS camera come with statistical properties including Poisson noise and pixel-dependent readout noise. If data is directly transformed and interpolated between two detection planes in 3D localization (i.e. treating plane 1 as reference and transforming the data from plane 2 to plane 1), the noise distribution will no longer maintain these statistical properties, resulting in imaging artifacts and localization imprecisions. Towards this end, a channel-specific PSF model was generated (i.e., transforming the model instead of transforming the data) for single molecule localization.

First, segmentation for raw data was carried out in plane 2 as follows. (1) The center position $(X_1, Y_1)$ of a cropped sub-region in plane 1 was recorded. (2) $(X_1, Y_1)$ was transformed by affine transformation to find its corresponding position $(X_2, Y_2)$ in plane 2. (3) A sub-region of raw data in plane 2 was cropped with an integer center $(X_{2int}, Y_{2int})$=floor$(X_2, Y_2)$, and the non-integer offset was calculated as $(\Delta x, \Delta y)=(X_2, Y_2)-(X_{2int}, Y_{2int})$. The noise calibration map (including offset, variance, and gain for each pixel) of the sCMOS camera for each sub-region was cropped in a similar way.

The position relationship of the single molecule between plane 1 and plane 2 can be described as:

$$(X_{2int} + x', Y_{2int} + y', 1) = (X_1 + x, Y_1 + y, 1)\begin{bmatrix} a & b & 0 \\ c & d & 0 \\ e & f & 1 \end{bmatrix},$$

where $(x, y)$ and $(x', y')$ are the positions of single molecules in the cropped sub-regions of two planes.

$$\begin{bmatrix} a & b & 0 \\ c & d & 0 \\ e & f & 1 \end{bmatrix}$$

is the matrix affine transformation including six parameters, where $$\begin{bmatrix} a & b \\ c & d \end{bmatrix}$$

represents scale, shear, and rotation operations, and $(e, f)$ represents the translation operation. Affine transformation is a linear transformation and can be written as $$\begin{cases} X_{2int} + x' = a(X_1 + x) + c(Y_1 + y) + e = aX_1 + cY_1 + e + ax + cy \\ Y_{2int} + y' = b(X_1 + x) + d(Y_1 + y) + f = bX_1 + dY_1 + f + bx + dy \end{cases}.$$

Since the center position of the cropped sub-region was transformed from plane 1 to plane 2 by the same affine matrix $$\begin{cases} X_2 = aX_1 + cY_1 + e = X_{2int} + \Delta x \\ Y_2 = bX_1 + dY_1 + f = X_{2int} + \Delta y \end{cases},$$

by combining above equations, the position relationship between $(x, y)$ and $(x', y')$ in cropped sub-regions can be described as:

$$\begin{cases} x' = ax + cy + \Delta x \\ y' = bx + dy + \Delta y \end{cases},$$

showing that the raw single molecule data and the cropped sub-region share the same scale, shear, and rotation parameters $$\begin{bmatrix} a & b \\ c & d \end{bmatrix}$$

between two planes, except for the translation parameters $(e, f)$.

Second, to generate the channel-specific PSF model in plane 2, the model should satisfy two conditions. First, it shares the same shape information (scale, shear, and rotation) with the cropped sub-regions. Second, it has the same center position before and after transformation. Therefore, the affine transformation applied to the model $$Affine_c = \begin{bmatrix} a & b & 0 \\ c & d & 0 \\ e' & f' & 1 \end{bmatrix}$$

should satisfy $$(X_c, Y_c, 1) = (X_c, Y_c, 1)\begin{bmatrix} a & b & 0 \\ c & d & 0 \\ e' & f' & 1 \end{bmatrix},$$

where $(X_c, Y_c)$ is the center position of the cropped sub-region (when performing affine transformation, the upper left corner of the image was defined as the origin, and X was equal to half of the sub-region size).

The translation parameters $(e', f')$ in $Affine_c$ can be calculated as:

$$\begin{cases} e' = (1-a)X_c - cY_c \\ f' = (1-d)Y_c - bX_c \end{cases}$$

Thus, the channel-specific PSF model in plane 2 can be described as $$\mu'_2(x',y',z)=\text{Trans}\{Affine_c[\mu_2(0,0,z)],(x',y')\},$$

where Trans is the translation operation and $\mu_2(0,0,z)$ represents the PSF model of plane 2 at position $(0,0,z)$. The model $\mu_2(0,0,z)$ was first transformed to the channel-specific model $\mu_2'(0,0,z)$ by affine transformation $Affine_c$, and then translated to the position $(x', y')$ given by the equation provided above.

Third, the channel-specific PSF model was directly incorporated inside the maximum likelihood estimator (MLE) to estimate seven parameters $(x,y,z,I_1,I_2,bg_1,bg_2)$ by considering the Poisson noise and pixel-dependent sCMOS noise as $$L(\theta \mid D) =$$

-continued $$\prod_q \frac{(\mu_{1q}+\gamma_{1q})^{(D_{1q}+\gamma_{1q})}e^{-(\mu_{1q}+\gamma_{1q})}}{\Gamma(D_{1q}+\gamma_{1q}+1)} \prod_q \frac{(\mu'_{2q}+\gamma_{2q})^{(D_{2q}+\gamma_{2q})}e^{-(\mu'_{2q}+\gamma_{2q})}}{\Gamma(D_{2q}+\gamma_{2q}+1)},$$

$$\theta \in (x, y, z, I_1, I_2, bg_1, bg_2),$$

where D is the cropped sub-region of two planes, q is the pixel index, $\mu_1$ and $\mu_2'$ represent the PSF models in planes 1 and 2, respectively.

$$\gamma_{mq} = \frac{\text{var}_{mq}}{g_{mq}^2},$$

where $\text{var}_{mq}$ and $g_{mq}$ are the variance and gain for pixel q in plane m (m=1, 2). $\theta$ denotes the fitting parameters including the same position (x, y, z), and different total photon counts ($I_1$, $I_2$) and background counts ($bg_1$, $bg_2$) for two planes. A modified Levenberg-Marquadt method was used to optimize $\theta$ by minimizing the negative log-likelihood function $$-\ln(L) = \sum_q \mu_{1q} - (D_{1q}+\gamma_{1q})\ln(\mu_{1q}+\gamma_{1q}) + \sum_q \mu'_{2q} - (D_{2q}+\gamma_{2q})\ln(\mu'_{2q}+\gamma_{2q}).$$

The first and second derivatives are $$f = -\frac{\partial \ln(L)}{\partial \theta} = \sum_q \left(1 - \frac{D_{1q}+\gamma_{1q}}{\mu_{1q}+\gamma_{1q}}\right)\frac{\partial \mu_{1q}}{\partial \theta} + \sum_q \left(1 - \frac{D_{2q}+\gamma_{2q}}{\mu'_{2q}+\gamma_{2q}}\right)\frac{\partial \mu'_{2q}}{\partial \theta},$$

$$f' = \frac{\partial f}{\partial \theta} = \sum_q \frac{D_{1q}+\gamma_{1q}}{(\mu_{1q}+\gamma_{1q})^2}\left(\frac{\partial \mu_{1q}}{\partial \theta}\right)^2 + \left(1 - \frac{D_{1q}+\gamma_{1q}}{\mu_{1q}+\gamma_{1q}}\right)\frac{\partial^2 \mu_{1q}}{\partial \theta^2} +$$

$$\sum_q \frac{D_{2q}+\gamma_{2q}}{(\mu'_{2q}+\gamma_{2q})^2}\left(\frac{\partial \mu'_{2q}}{\partial \theta}\right)^2 + \left(1 - \frac{D_{2q}+\gamma_{2q}}{\mu'_{2q}+\gamma_{2q}}\right)\frac{\partial^2 \mu'_{2q}}{\partial \theta^2},$$

where the second derivatives $$\frac{\partial^2 \mu_{1q}}{\partial \theta^2} \text{ and } \frac{\partial^2 \mu'_{2q}}{\partial \theta^2}$$

were set to 0, and the fitting parameters were updated from $$\theta_{n+1} = \theta_n - \frac{f}{f'(1+\beta)},$$

where $\beta$ is the damping factor to adjust the convergence speed, and which was set to 0 here.

For the astigmatism-based setup, we directly incorporated the PSF model in one plane inside the MLE to estimate five parameters (x, y, z, $I_1$, $bg_1$).

The localization speed in INSPR mainly depends on the speed of fitting the parameters in the 3D PSF model generated by the Fourier transform of the retrieved pupil function. To speed up this process, the cubic interpolation methods were used to pre-generate 3D PSF models along the axial direction for each voxel of 0.25 pixel×0.25 pixel×4 nm in the whole range of 25 pixels×25 pixels×2.6 µm. The GPU implementation of cubic interpolation achieves a localization speed of 240 PSFs per second, about 400 times faster than the CPU implementation using MATLAB. The code was tested on a computer with an Intel Core i7-8700K processor at 3.70 GHz with 32 GB memory and an NVIDIA GeForce GTX 1070 graphics card with 8.0 GB memory.

To quantify the Fisher information content of detected PSFs in INSPR, the Cramér-Rao lower bound (CRLB) for estimating localization precision in an unbiased estimator was calculated as $$\text{var}(\theta_i) \geq [F(\theta)^{-1}]_{ii},$$

where $\text{var}(\theta)$ is the estimation variance of an estimator, $F(\theta)$ is the Fisher information matrix, $\theta$ is a vector of estimation parameters, and i denotes the index of each parameter.

For biplane setup, by incorporating the noise characteristic (Poisson noise and pixel-independent readout noise) of the sCMOS camera and the channel-specific PSF model, the relevant Fisher information in each element can be calculated as $$F_{ij}(\theta) = \sum_q \frac{1}{\mu_{1q}+\gamma_{1q}}\frac{\partial \mu_{1q}}{\partial \theta_i}\frac{\partial \mu_{1q}}{\partial \theta_j} + \sum_q \frac{1}{\mu'_{2q}+\gamma_{2q}}\frac{\partial \mu'_{2q}}{\partial \theta_i}\frac{\partial \mu'_{2q}}{\partial \theta_j},$$

$$\theta \in (x, y, z, I_1, I_2, bg_1, bg_2),$$

where $\mu_1$ and $\mu_2$ represent the PSF models in planes 1 and 2, respectively. $\gamma$ is the noise characteristic of the sCMOS camera, and q is the pixel index. For astigmatism-based setup, the Fisher information in each element was calculated with parameters $\theta$Å (x,y,z,$I_1$,$bg_1$)

Furthermore, the Fisher information in the x and y dimensions was changed by considering the position relationship in the channel-specific PSF model $$\begin{cases} x' = ax + cy + \Delta x \\ y' = bx + dy + \Delta y \end{cases},$$

where (x, y) and (x', y') are the positions of the PSF model of two planes, ($\Delta x$, $\Delta y$) is the non-integer offset in plane 2, and $$\begin{bmatrix} a & b \\ c & d \end{bmatrix}$$

represents scale, shear, and rotation operations in affine transformation.

By calculating the derivative of the x dimension in plane 2

$$\frac{\partial \mu'_{2q}}{\partial x} = \frac{\partial \mu'_{2q}}{\partial x'}\frac{\partial x'}{\partial x} + \frac{\partial \mu'_{2q}}{\partial y'}\frac{\partial y'}{\partial x} = a\frac{\partial \mu'_{2q}}{\partial x'} + b\frac{\partial \mu'_{2q}}{\partial y'},$$

the Fisher information in the x dimension can be written as $$F_{xx} = \sum_q \frac{1}{\mu_{1q}+\gamma_{1q}}\left(\frac{\partial \mu_{1q}}{\partial x}\right)^2 + \sum_q \frac{1}{\mu'_{2q}+\gamma_{2q}}\left(\frac{\partial \mu'_{2q}}{\partial x}\right)^2$$

-continued $$= \sum_q \frac{1}{\mu_{1q}+\gamma_{1q}}\left(\frac{\partial \mu_{1q}}{\partial x}\right)^2 + \sum_q \frac{1}{\mu'_{2q}+\gamma_{2q}}\left(\frac{\partial \mu'_{2q}}{\partial x'}\frac{\partial x'}{\partial x}+\frac{\partial \mu'_{2q}}{\partial y'}\frac{\partial y'}{\partial x}\right)^2$$

$$= \sum_q \frac{1}{\mu_{1q}+\gamma_{1q}}\left(\frac{\partial \mu_{1q}}{\partial x}\right)^2 + \sum_q \frac{1}{\mu'_{2q}+\gamma_{2q}}\left(a\frac{\partial \mu'_{2q}}{\partial x'}+b\frac{\partial \mu'_{2q}}{\partial y'}\right)^2$$

Similarly, the Fisher information in the y dimension can be written as $$F_{yy} = \sum_q \frac{1}{\mu_{1q}+\gamma_{1q}}\left(\frac{\partial \mu_{1q}}{\partial y}\right)^2 + \sum_q \frac{1}{\mu'_{2q}+\gamma_{2q}}\left(c\frac{\partial \mu'_{2q}}{\partial x'}+d\frac{\partial \mu'_{2q}}{\partial y'}\right)^2.$$

CRLB is one criterion to measure the localization uncertainty with retrieved 3D PSF model given by the position (x, y, z), photon counts I, and background count bg. Smaller CRLB means higher localization confidence. Here the localization uncertainty in the z dimension ($CRLB_z$) is of concern. In order to improve the quality of reconstructed images, localizations with $CRLB_z$ larger than a certain threshold were rejected. This threshold was set to 30-70 nm for different biological samples.

Log-likelihood ratio (LLR) is another criterion to measure the similarity between each single molecule dataset and its corresponding PSF model, which can be expressed as $$LLR = -2\,\ln\!\left(\frac{L(\mu\mid D)}{L(D\mid D)}\right) =$$

$$\sum_q 2[\mu_{1q} - D_{1q} - (D_{1q}+\gamma_{1q})\ln(\mu_{1q}+\gamma_{1q}) + (D_{1q}+\gamma_{1q})\ln(D_{1q}+\gamma_{1q})] +$$

$$\sum_q 2[\mu'_{2q} - D_{2q} - (D_{2q}+\gamma_{2q})\ln(\mu'_{2q}+\gamma_{2q}) + (D_{2q}+\gamma_{2q})\ln(D_{2q}+\gamma_{2q})],$$

where D is the cropped sub-region of single molecule, μ is the PSF model, γ is the noise characteristic of the sCMOS camera, and q is the pixel index. Here LLR was set to 1000 for each 16×16 pixels in the single molecule dataset in biplane setup, and LLR was set to 600 in astigmatism-based setup. Besides, we rejected single molecules more than 800 nm out of focus in biplane setup, and 500 nm out of focus in astigmatism-based setup. Single molecules with total photon count lower than 1000 were rejected for both biplane and astigmatism-based setups in our reconstructions.

To image thick samples, optical sections were recorded as above. The drift correction and optical-section alignment were carried out according to a prior art described method. In each optical section, drift was calibrated by calculating the correlation between each 3D volume consisting of localized single molecules from 1000 frames using a redundancy-based correction method. These calibrated 3D volumes formed an about 1.6-μm-thick optical section. Whole cells or tissue specimens were scanned axially by translating the objective lens with a step size of 250 nm for astigmatism-based setup and 400 nm for biplane setup, which ensured enough overlapping regions between adjacent optical sections. The 3D correlation was performed based method to align two adjacent optical sections, and finally reconstructed a super-resolution 3D volume.

Those having ordinary skill in the art will recognize that numerous modifications can be made to the specific implementations described above. The implementations should not be limited to the particular limitations described. Other implementations may be possible.

The invention claimed is:

1. A method of point spread function (PSF) retrieval for three-dimensional nanoscopy, comprising:
    A) encoding 3D location of molecules into a plurality of fluorescence emission patterns expressed as point spread functions (PSFs) detected on a camera;
    B) receiving one or more images containing a plurality of PSFs generated by molecules within a specimen;
    C) segmenting the received one or more images into a plurality of sub-regions containing isolated PSFs (sub-PSFs) from point sources;
    D) initializing a plurality of template PSFs, each of which is generated from an initial pupil function based on a corresponding axial distance between an image plane (where the point-source locates) and a focal plane of the objective;
    E) cross correlating each of the plurality of sub-PSFs with each of the plurality of template PSFs, thereby generating a corresponding plurality of normalized cross correlation coefficients;
    F) determining a maximum normalized cross correlation coefficient from the plurality of normalized cross correlation coefficients;
    G) associating each of the plurality of sub-PSFs with a corresponding template PSF of the plurality of template PSFs based on which template PSF produced the maximum normalized cross correlation coefficient and storing each of the plurality of sub-PSFs in an associated bin corresponding to each of the plurality of template PSFs;
    H) aligning each of the bin-associated sub-PSFs;
    I) averaging the aligned sub-PSFs;
    J) applying a phase retrieval algorithm to the averaged sub-PSFs to thereby update the pupil function;
    K) regenerating the plurality of template PSFs from the updated pupil function;
    L) repeating steps E-K until a difference between a new and a prior generation pupil function is below a predetermined threshold;
    M) generating in situ PSFs from the last pupil function; and
    N) applying a maximum likelihood estimation algorithm based on the in situ PSFs and the plurality of sub-PSFs to thereby generate lateral and axial locations of molecules within the specimen.

2. The method of claim 1, wherein the encoding is performed by applying a vertical astigmatism.

3. The method of claim 2, wherein the vertical astigmatism is applied by inserting a cylindrical lens.

4. The method of claim 1, wherein the encoding is performed by applying a biplane detection, where two axially separated planes are detected.

5. The method of claim 1, wherein the template PSFs and in situ PSFs are generated by calculating magnitude squared of a Fourier transform of the pupil function at different axial distances.

6. The method of claim 1, wherein the phase retrieval algorithm includes inverse Fourier transform to the averaged aligned sub-PSFs.

7. The method of claim 1, wherein the aligning is lateral.

8. The method of claim 1, wherein the aligning is axial.

9. The method of claim 1, wherein the aligning is lateral and axial.

10. The method of claim 1, wherein the maximum likelihood estimation is based on maximizing probabilities of lateral and axial locations of molecules within the specimen based on the in situ PSFs and the plurality of sub-PSFs.

11. A system for point spread function (PSF) retrieval for three-dimensional nanoscopy, comprising:
a nanoscopy imaging device adapted to provide nanoscale images of objects;
a 3D encoder adapted to provide 3D location of molecules into a plurality of fluorescence emission patterns expressed as point spread functions (PSFs) detected on a camera;
a processing system, including memory and a processor, the processor adapted to:
A) receive one or more images containing a plurality of PSFs generated by molecules within a specimen;
B) segment the received one or more images into a plurality of sub-regions containing isolated PSFs (sub-PSFs) from point sources;
C) initialize a plurality of template PSFs, each of which is generated from an initial pupil function based on a corresponding axial distance between an image plane (where the point-source locates) and a focal plane of the objective;
D) cross correlate each of the plurality of sub-PSFs with each of the plurality of template PSFs, thereby generating a corresponding plurality of cross correlation coefficients;
E) determine a maximum normalized cross correlation coefficient from the plurality of normalized cross correlation coefficients;
F) associate each of the plurality of sub-PSFs with a corresponding template PSF of the plurality of template PSFs based on which template PSF produced the maximum normalized cross correlation coefficient and storing each of the plurality of sub-PSFs in an associated bin corresponding to each of the plurality of template PSFs;
G) align each of the bin-associated sub-PSFs;
H) average the aligned sub-PSFs;
I) apply a phase retrieval algorithm to the averaged sub-PSFs to thereby update the pupil function;
J) regenerate the plurality of template PSFs from the updated pupil function;
K) repeat steps D-J until a difference between a new and a prior generation pupil function is below a predetermined threshold;
L) generate in situ PSFs from the last pupil function; and
M) apply a maximum likelihood estimation algorithm based on the in situ PSFs and the plurality of sub-PSFs to thereby generate lateral and axial locations of molecules within the specimen.

12. The system of claim 11, wherein the encoding is performed by applying a vertical astigmatism.

13. The system of claim 12, wherein the vertical astigmatism is applied by a cylindrical lens.

14. The system of claim 11, wherein the encoding is performed by applying a biplane registration.

15. The system of claim 11, wherein the template PSFs and in situ PSFs are generated by calculating magnitude squared of a Fourier transform of the pupil function at different axial distances.

16. The system of claim 11, wherein the phase retrieval algorithm includes inverse Fourier transform to the averaged aligned sub-PSFs.

17. The system of claim 11, wherein the aligning is lateral.

18. The system of claim 11, wherein the aligning is axial.

19. The system of claim 11, wherein the aligning is lateral and axial.

20. The system of claim 11, wherein the maximum likelihood estimation is based on maximizing probabilities of lateral and axial locations of molecules within the specimen based on the in situ PSFs and the plurality of sub-PSFs.

* * * * *